US 8,514,809 B2

(12) United States Patent
Hwang et al.

(10) Patent No.: US 8,514,809 B2
(45) Date of Patent: Aug. 20, 2013

(54) MAPPING QUALITY OF SERVICE FOR INTERSYSTEM HANDOVER

(75) Inventors: Woonhee Hwang, Espoo (FI); Kaisu M. Iisakkila, Espoo (FI); Mari-Jaana S. Pelkonen, Tuusula (FI); Stefan M. Baggstrom, Tampere (FI); Jukka I. Hongisto, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 915 days.

(21) Appl. No.: 12/291,878

(22) Filed: Nov. 14, 2008

(65) Prior Publication Data

US 2009/0129342 A1 May 21, 2009

Related U.S. Application Data

(60) Provisional application No. 61/003,382, filed on Nov. 16, 2007.

(51) Int. Cl.
*H04W 4/00* (2009.01)

(52) U.S. Cl.
USPC ............................................................ 370/331

(58) Field of Classification Search
USPC ............................ 370/331, 332, 333
See application file for complete search history.

(56) References Cited

U.S. PATENT DOCUMENTS

| | | | |
|---|---|---|---|
| 6,845,095 B2* | 1/2005 | Krishnarajah et al. | 370/349 |
| 7,324,489 B1* | 1/2008 | Iyer | 370/338 |
| 7,532,613 B1* | 5/2009 | Sen et al. | 370/352 |
| 7,746,819 B2* | 6/2010 | Skog et al. | 370/328 |
| 2007/0025301 A1* | 2/2007 | Petersson et al. | 370/338 |
| 2007/0264997 A1* | 11/2007 | Chaudhary et al. | 455/426.1 |
| 2008/0192697 A1* | 8/2008 | Shaheen | 370/331 |
| 2008/0320149 A1* | 12/2008 | Faccin | 709/228 |
| 2010/0246533 A1* | 9/2010 | Lundin et al. | 370/332 |

FOREIGN PATENT DOCUMENTS

| | | |
|---|---|---|
| WO | WO 03/065680 A1 | 8/2003 |
| WO | WO 2007/144757 A2 | 12/2007 |

OTHER PUBLICATIONS

3GPP TR 23.882 V1.12.0 (Oct. 2007) Technical Report 3rd Generation Partnership Project; Technical Specification Group Services and System Aspects; 3GPP System Architecture Evolution: Report on Technical Options and Conclusions (Release 7).
Ljubljana, Slovenia Nov. 12-16, 2007 TD S2-075268.
Ljubljana, Slovenia Nov. 12-16, 2007 TD S2-075269.
Kobe, Japan Oct. 8-12, 2007 TD S2-074400.
3GPP TS 29.060 V7.7.0 (Sep. 2007), $3^{rd}$ Generation Partnership Project, Technical Specification Group Core Network and Terminal.

(Continued)

Primary Examiner — Mark Rinehart
Assistant Examiner — Mohammad Anwar
(74) Attorney, Agent, or Firm — Harrington & Smith

(57) ABSTRACT

In accordance with the exemplary embodiments of the invention there is a method, executable computer program, and apparatus for receiving information including at least one packet data protocol context of a target network, and based on the information, for mapping in a source network at least one bearer to the at least one packet data protocol context. In addition, in accordance with another exemplary embodiment of the invention there is a method, executable computer program, and apparatus for receiving from a source network device information comprising an indication of at least one bearer mapped to the at least one packet data protocol context of a target network, and storing the received information for use in a handover.

36 Claims, 12 Drawing Sheets

(56) References Cited

OTHER PUBLICATIONS

3GPP TS 43.129 V6.12.0 (May 2007), 3rd Generation Partnership Project, Technical Specification Group Geran.
3GPP TS 29.060 V6.18.0 (Sep. 2007), 3rd Generation Partnership Project, Technical Specification Group Core Network and Terminal.
3GPP TS 36.300 V8.2.0 (Sep. 2007), 3rd Generation Partnership Project, Technical Specification Group Radio Access Network.
3GPP TS 23.402 V1.4.0 (Sep. 2007), 3rd Generation Partnership Project, Technical Specification Group Services and System Aspects.
3GPP TS 23.203 V7.4.0 (Sep. 2007), 3rd Generation Partnership Project, Technical Specification Group Services and System Aspects.
3GPP TR 21.905 V8.2.0 (Sep. 2007), 3rd Generation Partnership Project, Technical Specification Group Services and System Aspects.
3GPP TS 23.401 V1.3.0 (Oct. 2007), 3rd Generation Partnership Project, Technical Specification Group Services and System Aspects.
3GPP TSG RAN WG3 Meeting #56 R3-070971 Kobe, May 7-11, 2007 Source: Fujitsu Title: Updates to LTE Intra/Inter Handover Procedure Text—Stage 2 (5 pages).

* cited by examiner

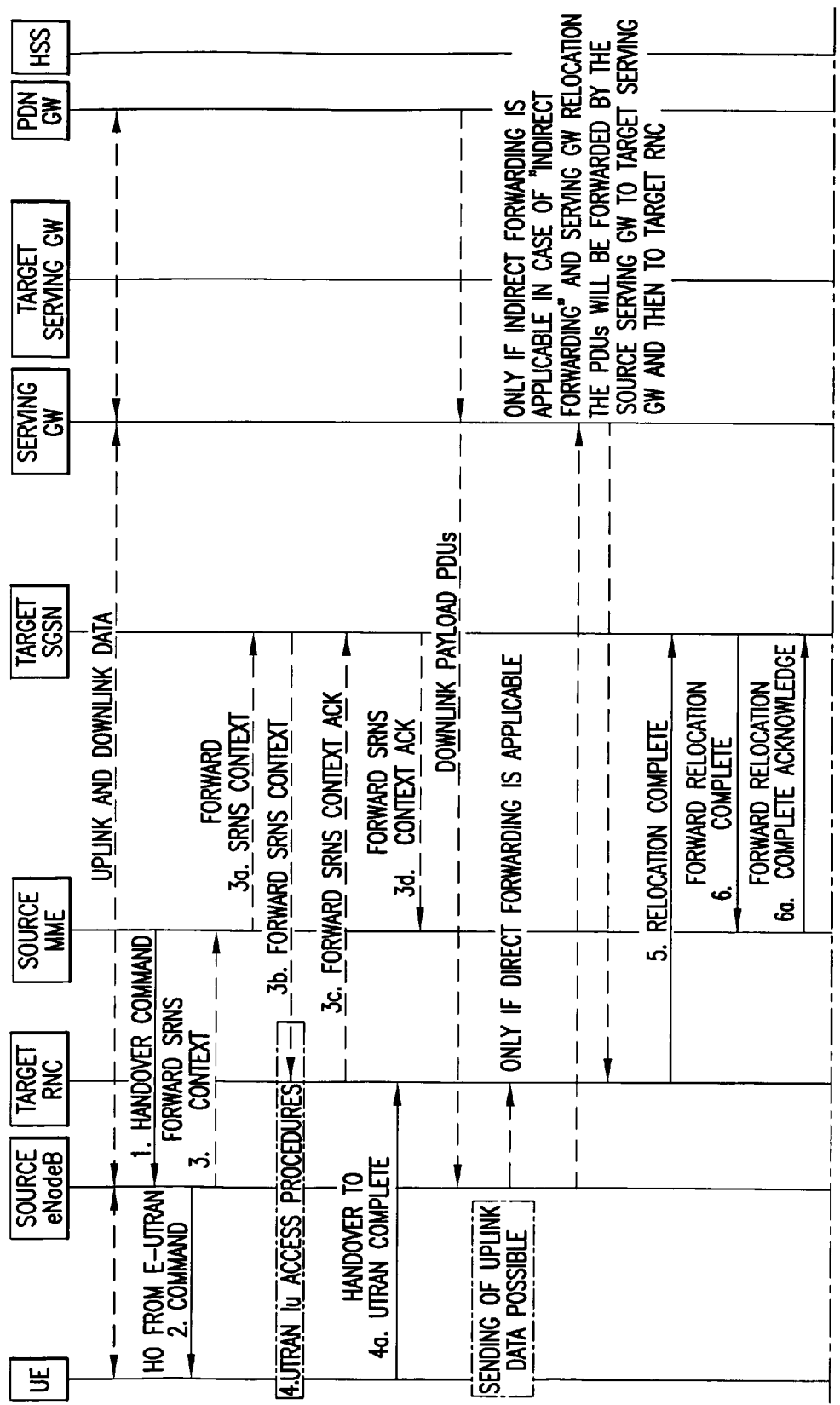

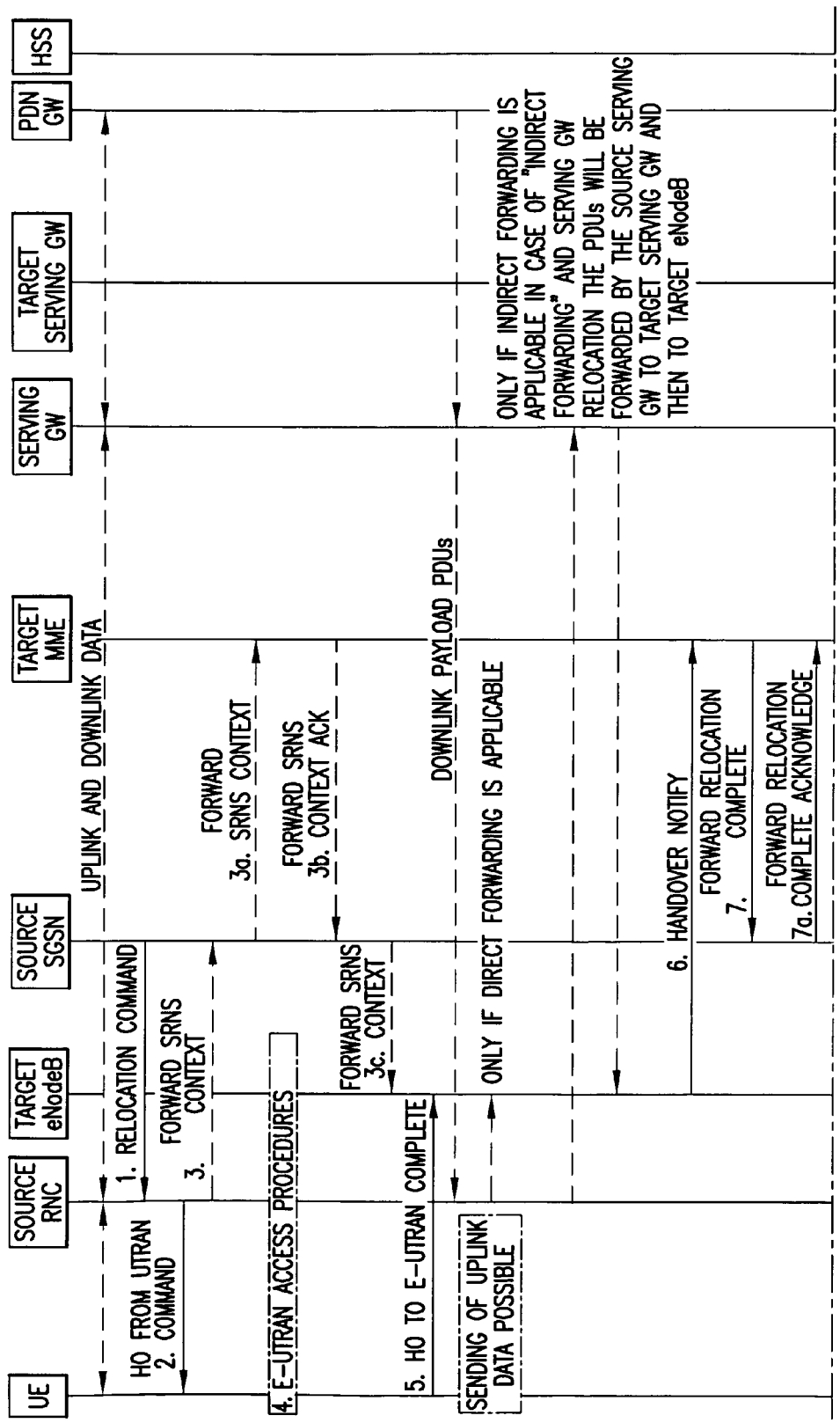

MAPPING QUALITY OF SERVICE FOR INTERSYSTEM HANDOVER

CROSS-REFERENCE TO RELATED APPLICATIONS

This patent application claims priority under 35 U.S.C. §119(e) from Provisional Patent Application No. 61/003,382, filed Nov. 16, 2007, the disclosure of which is incorporated by reference herein in its entirety.

TECHNICAL FIELD

The teachings herein relate generally to handovers of user equipment between different wireless access networks such as between LTE and 3G/2G networks, and are particularly directed to fully supporting quality of service requirements throughout the handover

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations and terms are herewith defined:
- 3GPP third generation partnership project
- DL downlink
- EPS evolved packet system
- E-UTRAN evolved UTRAN
- GBR guaranteed bit rate
- GPRS general packet radio service
- HO handover
- IE information element
- IRAT inter radio access technology
- ISHO intersystem handover
- LTE long term evolution of 3GPP (also termed E-UTRAN, 3.9G or SAE)
- MME mobility management entity
- Node B base station or similar network access node
- PCRF policy and charging rules function
- PDP packet data protocol
- QCI QoS class identifier
- OoS quality of service
- RAN radio access node
- RTSP real time streaming protocol
- SAE system architecture evolution
- SDP session description protocol
- SGSN serving GPRS support node
- SIP session initiation protocol
- TEID tunnel end point identifier
- TFT traffic flow template
- UE user equipment (e.g., mobile equipment/station)
- UL uplink
- UMTS universal mobile telecommunications system
- UPE user plane entity (e.g., a combined LTE anchor and 3GPP anchor)
- UTRAN UMTS terrestrial radio access network 3GPP is standardizing the long-term evolution (LTE) of the radio-access technology which aims to achieve reduced latency, higher user data rates, improved system capacity and coverage, and reduced cost for the operator. An overview of the system architecture is shown in FIG. 1a which similarly reproduces FIG. 4.2.1-1 of 3GPP TS 23.401: GPRS Enhancements for E-UTRAN Access (Release 8), ver 1.3.0 (2007-10), and in FIG. 1b taken from 3GPP TR 23.882, herein incorporated by reference), wherein the aspects relevant to these disclosures concern handing over of a user device (e.g., mobile terminal/mobile station/handset) between a first type of network such as the LTE network shown and a different type of network such as for example a 2G or 3G network shown as UTRAN or GERAN in FIGS. 1a and 1b. This is termed generally an inter-RAT or intersystem handover since it is a handover between different radio access technologies RATs or systems. Inter-RAT handovers are challenging because the different systems have typically been developed with different tradeoffs and so they often operate such that analogous nodes such as base stations in the different systems operate with a different set of information requirements, and the different information is resident in different ones of the network nodes and user equipment.

One of those disparities as between at least LTE and 2G/3G networks is quality of service (QoS) support. QoS is implemented in SAE/LTE using network controlled and network initiated dedicated bearers. QoS is implemented in 3G/2G systems by packet data protocol PDP contexts, which are controlled by the mobile terminals. Since LTE is a new 3GPP system and still being finalized, there has not been a QoS problem with handovers between LTE and 2G/3G systems, and the inventors are aware of no mechanism in the prior art by which such a handover with proper QoS support might be accomplished.

Relevant to this disclosure are sections 5.4 through 5.5 of 3GPP TS 23.401: GPRS Enhancements for E-UTRAN Access (Release 8), ver 1.3.0 (2007-10). As used herein, a bearer is an information transmission path of defined capacity, delay or bit error rate, etc. as defined in 3GPP TR 21.905 v8.2.0 (or in subsequent versions thereof): Vocabulary for 3GPP Specifications. A multi-radio terminal as used herein (for brevity, a terminal or a UE) is a terminal which can be used in 2G and/or 3G as well as in LTE access networks. Such a terminal can be for example a network card used as a modem for a laptop computer or for a particular mobile handset such as current mobile phones.

For a proper handover, it is required that the target access system would have full QoS support for the terminal immediately when the terminal releases the connection to the old access system. During intersystem handover from SAE/LTE to 3G/2G, it is assumed that the LTE network controlled dedicated bearers would be changed or mapped to the 3G/2G terminal controlled PDP contexts. This requires that not only primary, but also requested secondary contexts are pre-established in the target 3G/2G access network before the terminal is released from the source LTE access network. In the current 3G/2G system, the secondary PDP context is created only if the terminal has requested it. Therefore the terminal has at all times knowledge of the secondary PDP context. If the target access system in a terminal handover is an LTE system and the old access system is a 3G/2G access system, then since the terminal being handed over has knowledge of its secondary PDP context, any dedicated bearers that are created would be in response to the terminal's request to the LTE network. But this raises several questions in order to properly support QoS in the handover. How does one ensure that all the necessary secondary contexts are created so that the proper dedicated bearers can be mapped to them? Said another way, it is important to avoid pre-establishing PDP contexts which are not supported by the UE, and to either pre-establish all of the UE supported PDP contexts in the handover preparation phase of indicate to the terminal in some other way which ones are not.

What is needed in the art is a way to address QoS for intersystem handovers so as to resolve the above issues.

SUMMARY

In an exemplary aspect of the invention, there is a method comprising receiving information comprising at least one packet data protocol context of a target network, and based on the information, mapping in a source network at least one bearer to the at least one packet data protocol context.

In another exemplary aspect of the invention, there is a computer readable medium encoded with a computer program executable by a processor to perform actions comprising receiving information comprising at least one packet data protocol context of a target network, and based on the information, mapping in a source network at least one bearer to the at least one packet data protocol context.

In an exemplary aspect of the invention, there is an apparatus comprising a receiver, the receiver configured to receive information comprising at least one packet data protocol context of a target network, and a processor configured, based on the information, to map in a source network at least one bearer to the at least one packet data protocol context.

In another exemplary aspect of the invention, there is an apparatus comprising means for receiving information comprising at least one packet data protocol context of a target network, and means, based on the information, for mapping in a source network at least one bearer to the at least one packet data protocol context.

In accordance with the exemplary aspects of the invention above, the means for receiving comprises a receiver, and the means for mapping comprises a processor.

In an exemplary aspect of the invention, there is a method comprising receiving from a source network device information comprising an indication of at least one bearer mapped to at least one packet data protocol context of a target network, and storing the received information for use in a handover.

In still another exemplary aspect of the invention, there is an apparatus comprising a receiver, the receiver configured to receive from a source network device information comprising an indication of at least one bearer mapped to at least one packet data protocol context of a target network, and a processor and a memory configured to store the received information for use in a handover.

In yet another exemplary aspect of the invention, there is an apparatus comprising means for receiving from a source network device information comprising an indication of at least one bearer mapped to at least one packet data protocol context of a target network, and means for storing the received information for use in a handover.

In accordance with the exemplary aspects of the invention above, the means for receiving comprises a receiver; and the means for storing comprises a processor and a memory.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1A:
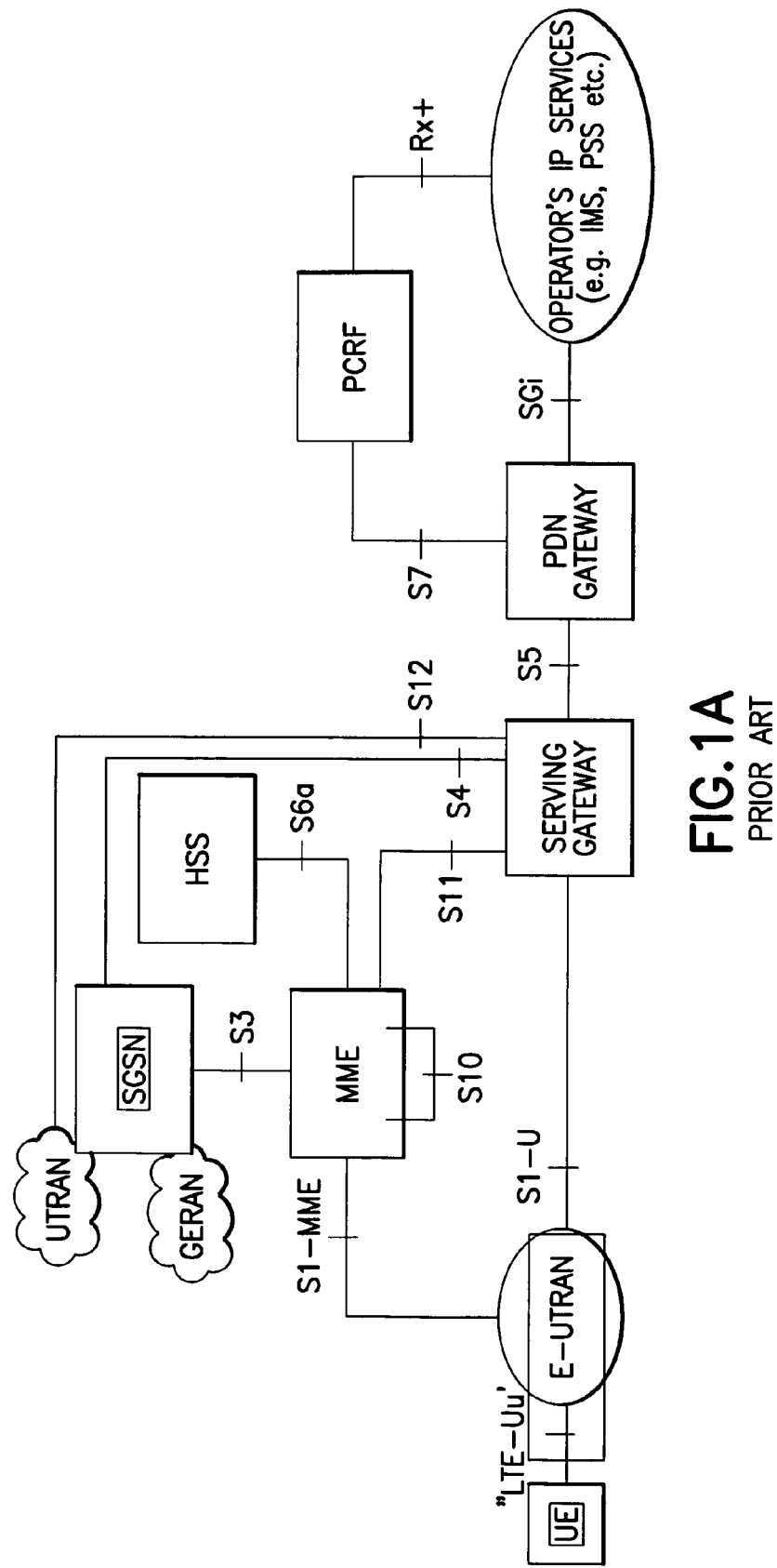
FIG. 1a is a prior art architecture for 3GPP access similar to FIG. 4.2.1-1 of 3GPP TS 23.401 (v 1.3.0)
Figure 1B:
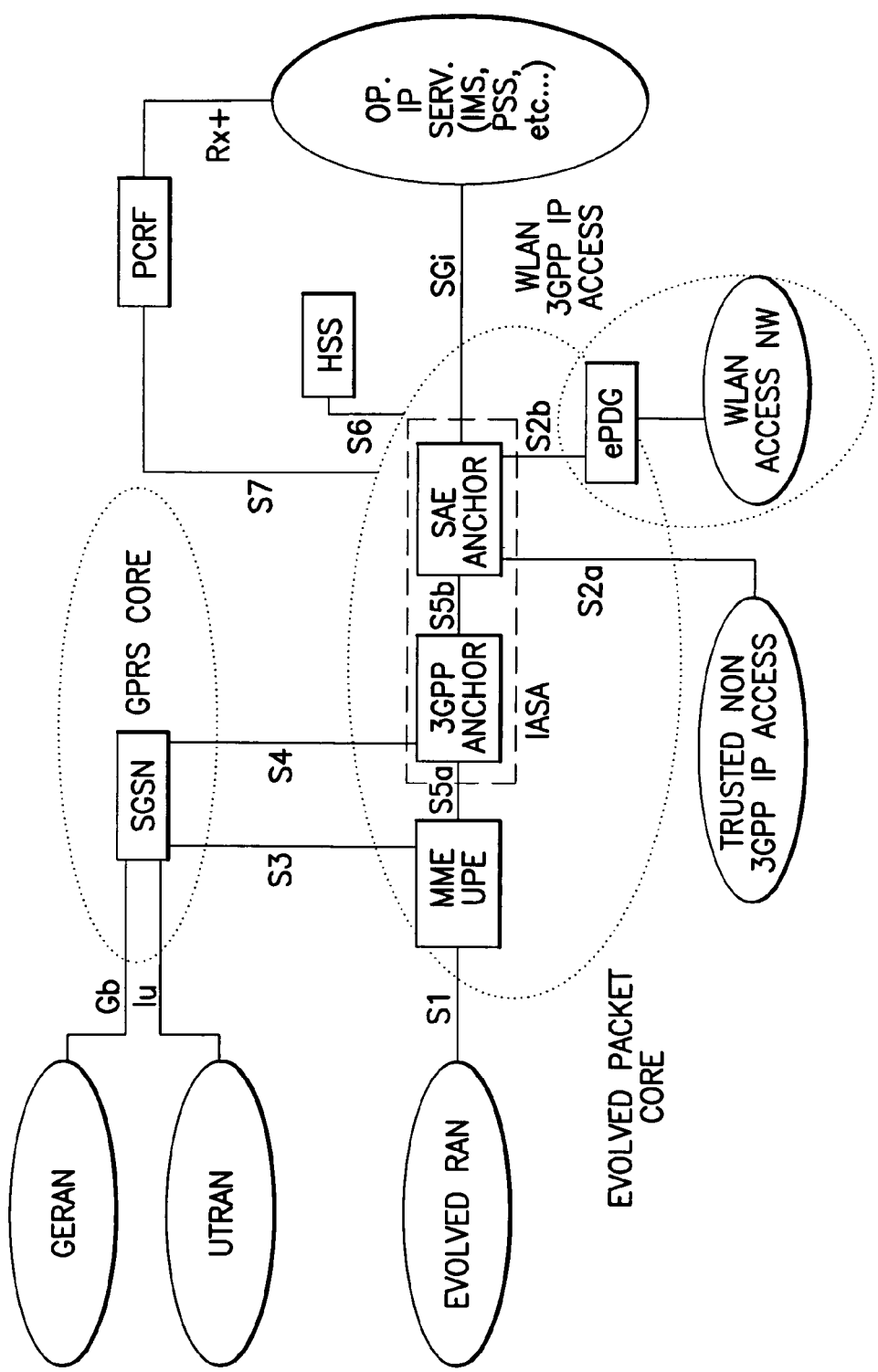
FIG. 1b is a prior art schematic diagram of LTE system architecture evolution showing different access technologies (extract of TR 23.882)

One approaches a solution to the above stated problems by properly phrasing the issue. For the case where a MME in LTE pre-establishes the secondary PDP contexts according to a mapping rule in the MME, how does one address the situation if the mobile terminal does not support all of them? One possibility is to create in the handover preparation phase PDP contexts based on the SAE Bearers without any knowledge of whether or not the terminal is capable of supporting the requested secondary contexts. Then after handover, the network might detect the unused PDP contexts and deactivate them. These disclosures reject that approach as wasteful of those pre-reserved network resources for the unsupported PDP context, and further because it fails to address the potential loss of any downlink data that uses the unsupported PDP context [e.g., DL packets that are directed to the terminal but which are received at the UPE (e.g., GGSN) during the intersystem handover]. Another possible solution is that the source LTE network could know the supported PDP context beforehand, and during intersystem handover request that the target network only setup resources for the supported PDP contexts. This is seen as a more comprehensive approach that addresses the problem without wasting radio resources. These disclosures detail a method to transmit to the MME information about terminal-supported PDP contexts in the LTE access. It is noted that the term system architecture evolution (SAE) as used may also be considered an evolved packet system (EPS). As such any reference to one or the other is not limiting to that reference.

The exemplary embodiments of this invention include a solution to map SAE/EPS LTE bearers to and from the PDP context during the intersystem (LTE<->2G/3G) handover. These exemplary embodiments are relevant to both the network as well as to the terminal for such a handover. Importantly, these exemplary embodiments detail how to prevent establishing certain secondary PDP contexts in a target 2G/3G network which the UE is not able to support.

To support inter-system HO from LTE to 2G/3G, SAE bearers have to map to PDP contexts. Also to support inter-system HO from 2G/3G to LTE, PDP contexts have to map to SAE bearers. One approach is that SAE Default Bearer(s)

map to the Primary PDP Context and SAE Dedicated Bearers map to the Secondary PDP Context. Generally, the messages of these signalling diagrams are sequential as indicated and sent automatically in response to the previously received message or function block shown.

For the inter-system HO from the 2G/3G access system to the LTE access system, one particular solution is as follows. After the SGSN forwards the contexts to MME during HO preparation, the MME can initiate the bearers according to the mapping rule in it. For the inter-system HO from LTE to 2G/3G, further consideration is needed. According to an embodiment of this invention the MME is responsible for generating the mapping between the SAE bearer and the PDP context. The UE non-access stratum NAS layer has the knowledge that there is a QoS request, and the corresponding UL TFT to SAE bearer mapping. But according to release 99 (R99 QoS Profile Requested message), the UE NAS layer has no details of that QoS request. According to an embodiment of this invention, there is a notification sent from the SAE/LTE network to the UE when the SAE bearer is setup that resources are reserved for this TFT as well as the corresponding guaranteed bit rate information. The SAE/LTE network also provides the UE with information about the corresponding PDP context QoS for the bearer. This information is stored locally in the UE but not used while the terminal is in LTE access. Note that this information is bearer specific and not application specific, so the UE's application layer cannot use this directly. The UE has two possible ways to share this information with the MME, 1) during SAE dedicated bearer setup signalling or 2) before intersystem handover. Solution 1) has advantages in the case of idle mode mobility between different 3GPP accesses, because the MME has the knowledge of the PDP contexts in the UE without additional signalling before/during the handover.

Now consider part 2) above. When the source eNB asks the UE to measure the cells under 2G/3G, the UE collects information of supported secondary PDP contexts and includes that as a NAS message in the measurement report. The UE does not perform context mapping itself. Instead, during SAE bearer setup signaling the MME gives the corresponding R99 QoS profile that was negotiated for the UE (see 3GPP TS 23.401, section 5.5.2 for ISHO between LTE and 2G/3G). The UE will choose the SAE bearers for which it will support secondary PDP context, and inform the MME about those bearers. Alternatively, the UE doesn't include the supported secondary PDP context information in the measurement report, but rather sends it as a different NAS message directly to the MME during SAE bearer setup. For the case where the dedicated bearer is setup for an application, which has performed the inter-terminal QoS request, the terminal/UE will indicate to the MME during bearer setup that the terminal/UE will support secondary PDP context for that bearer. For the case where the terminal/UE is not able to combine the allocated dedicated bearer to any inter-terminal QoS request, it will inform the MME that no secondary PDP context is supported for that SAE bearer for an inter-system handover to a 2G/3G cell. For the case where the source eNB decides to perform inter-system HO towards 2G/3G cells, this supported PDP context information will be forwarded to the MME. For the case where the supported PDP context information is already available via a NAS message, the MME will already have it when the eNB sends a message to the MME to initiate HO preparation.

In both solutions the MME can forward these pre-established PDP contexts to the SGSN during the intersystem handover preparation phase and the SGSN will use them right away. Or, based on operator policy, the MME may further modify the PDP context information and send it to the SGSN. In more detail, the MME will send the PDP context information to the SGSN as a normal 2G-to-3G or 3G-to-2G inter-SGSN HO. In the target network the SGSN asks the RNC to setup radio access bearers for the requested PDP contexts. Depending on the resources and operator policies in the target network, the established PDP context may vary from the requested PDP context. Therefore, an embodiment of the invention additionally has the MME sending the pre-established PDP context information via the eNB to the UE, after the HO preparation is successfully performed in the target 2G/3G side. This PDP context information is to be coded as NAS PDU or as an information element in the control interface between the MME and the eNB and between the eNB and the UE.

This solution provides an efficient way to perform the inter-system (LTE<->2G/3G) handover and provides a simple rule for mapping between LTE QoS and 2G/3G QoS. This solution also prevents loss of the packet in case the UE doesn't support all the pre-established secondary PDP contexts in the case of a LTE to 2G/3G handover. It is expected that this solution could be adopted into a wireless standard, such as LTE. For instance, the (LTE) Handover Complete message has to indicate which PDP contexts are usable, and that information has to be delivered all the way to the GGSN (analogous to the 3GPP anchor).

FIGS. 2-7 illustrate signaling diagrams for the various scenarios, adapted according to 3GPP TS 23.401 v1.3.0 (2007-10). Specific cross reference to TS 23.401 may be found in the Brief Description of the Drawings above. Bolded text specifically indicates signaling according to embodiments of this invention that differs from signaling described in the version of TS 3.401 at the time of this application. Reference numbers are specific only to the figure with which they are detailed.

Figure 2:
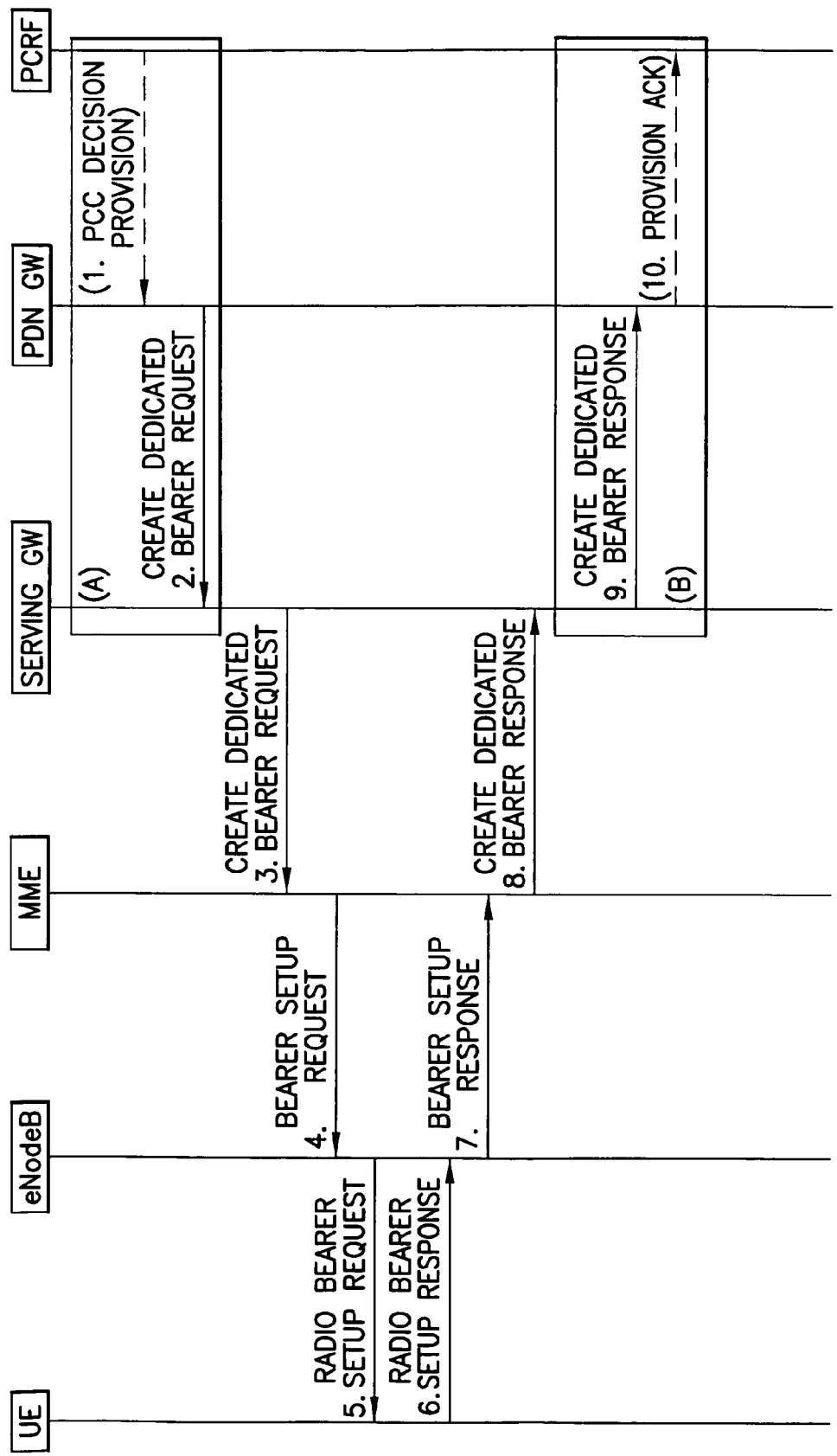
FIG. 2 is a signaling diagram similar to FIG. 5.4.1-1 of 3GPP TS 23.401 (v 1.3.0) with specific signaling according to an embodiment of the invention.

FIG. 2: Dedicated Bearer Activation Procedure, UE in Active Mode. According to aspects of this invention, TS 23.401 section 5.4.1 Session Management, QoS and interaction with PCC functionality is amended by the bolded text below to read as follows with reference to FIG. 2:

NOTE: Steps 3-8 are common for architecture variants with GTP based S5/S8 and PMIP-based S5/S8. For an PMIP-based S5/S8, procedure steps (A) and (B) are defined in 3GPP TS 23.402[2]. Steps 1, 2, 9 and 10 concern GTP based S5/S8.

1. If dynamic PCC is deployed, the PCRF sends a PCC decision provision (QoS policy) message to the PDN GW. If dynamic PCC is not deployed, the PDN GW may apply local QoS policy.
2. The PDN GW uses this QoS policy to assign the bearer QoS, i.e., it assigns the values to the bearer level QoS parameters (excluding AMBR); see clause 4.7.2. The PDN GW sends a Create Dedicated Bearer Request message (PTI, Bearer QoS, UL TFT, S5/S8 TEID, LBI) to the Serving GW, the Linked EPS Bearer Identity (LBI) is the EPS Bearer Identity of the default bearer. The Procedure Transaction Id (PTI) parameter is only used when the procedure was initiated by a UE Requested Bearer Resource Allocation Procedure—see clause 5.4.5.
3. The Serving GW sends the Create Dedicated Bearer Request (PTI, Bearer QoS, UL TFT, S1-TEID, LBI) message to the MME.
4. The MME selects an EPS Bearer Identity, which has not yet been assigned to the UE. The MME then builds a Session Management Configuration IE including the PTI, UL TFT, the EPS Bearer Identity and the Linked EPS Bearer Identity (LBI). If the UE has UTRAN or GERAN capabilities, the MME uses the EPS bearer QoS information to derive the corresponding PDP context parameters QoS Negotiated (R99 QoS profile), Radio Priority and Packet Flow Id and includes them in the Session Management Configuration. If the UE indicated in the UE Network Capability it does not support BSS packet flow procedures, then the MME shall not include the Packet Flow Id. The MME then signals the Bearer Setup Request (Bearer QoS, Session Management Configuration, S1-TEID) message to the eNodeB.

5. The eNodeB maps the bearer QoS to the Radio Bearer QoS. It then signals a Radio Bearer Setup Request (Radio Bearer QoS, Session Management Configuration, EPS RB Identity) message to the UE. The UE shall store the QoS Negotiated, Radio Priority, Packet Flow Id, which it received in the Session Management Configuration, for use when accessing via GERAN or UTRAN. The UE NAS stores the EPS Bearer Identity and links the dedicated bearer to the default bearer indicated by the Linked EPS Bearer Identity (LBI). The UE uses the uplink packet filter (UL TFT) to determine the mapping of service data flows to the radio bearer.

NOTE: The details of the Radio Bearer QoS are specified by RAN2.

6. The UE NAS layer builds a Session Management Response IE including the EPS Bearer Identity. If the UE is 2G/3G capable, it also checks whether it is able to support a secondary PDP context corresponding to that dedicated EPS Bearer. The indication of secondary PDP context support is included in Session Management Response IE. The UE then acknowledges the radio bearer activation to the eNodeB with a Radio Bearer Setup Response (Session Management Response) message.

7. The eNodeB acknowledges the bearer activation to the MME with a Bearer Setup Response (EPS Bearer Identity, S1-TEID, Session Management Response) message. The eNodeB indicates whether the requested Bearer QoS could be allocated or not.

8. The MME acknowledges the bearer activation to the Serving GW by sending a Create Dedicated Bearer Response (EPS Bearer Identity, S1-TEID) message. The MME stores the information whether a secondary PDP context is supported for this dedicated EPS bearer. This information is used only in case of intersystem handover to 2G/3G network.

9. The Serving GW acknowledges the bearer activation to the PDN GW by sending a Create Dedicated Bearer Response (EPS Bearer Identity, S5/S8-TEID) message.

10. If the dedicated bearer activation procedure was triggered by a PCC Decision Provision message from the PCRF, the PDN GW indicates to the PCRF whether the requested PCC decision (QoS policy) could be enforced or not by sending a Provision Ack message.

NOTE: The exact signalling of step 1 and 10 (e.g. in case of local break-out) is outside the scope of this specification. This signalling and its interaction with the dedicated bearer activation procedure are to be specified in 3GPP TS 23.203 [6]. Steps 1 and 10 are included here only for completeness.

Figure 3:
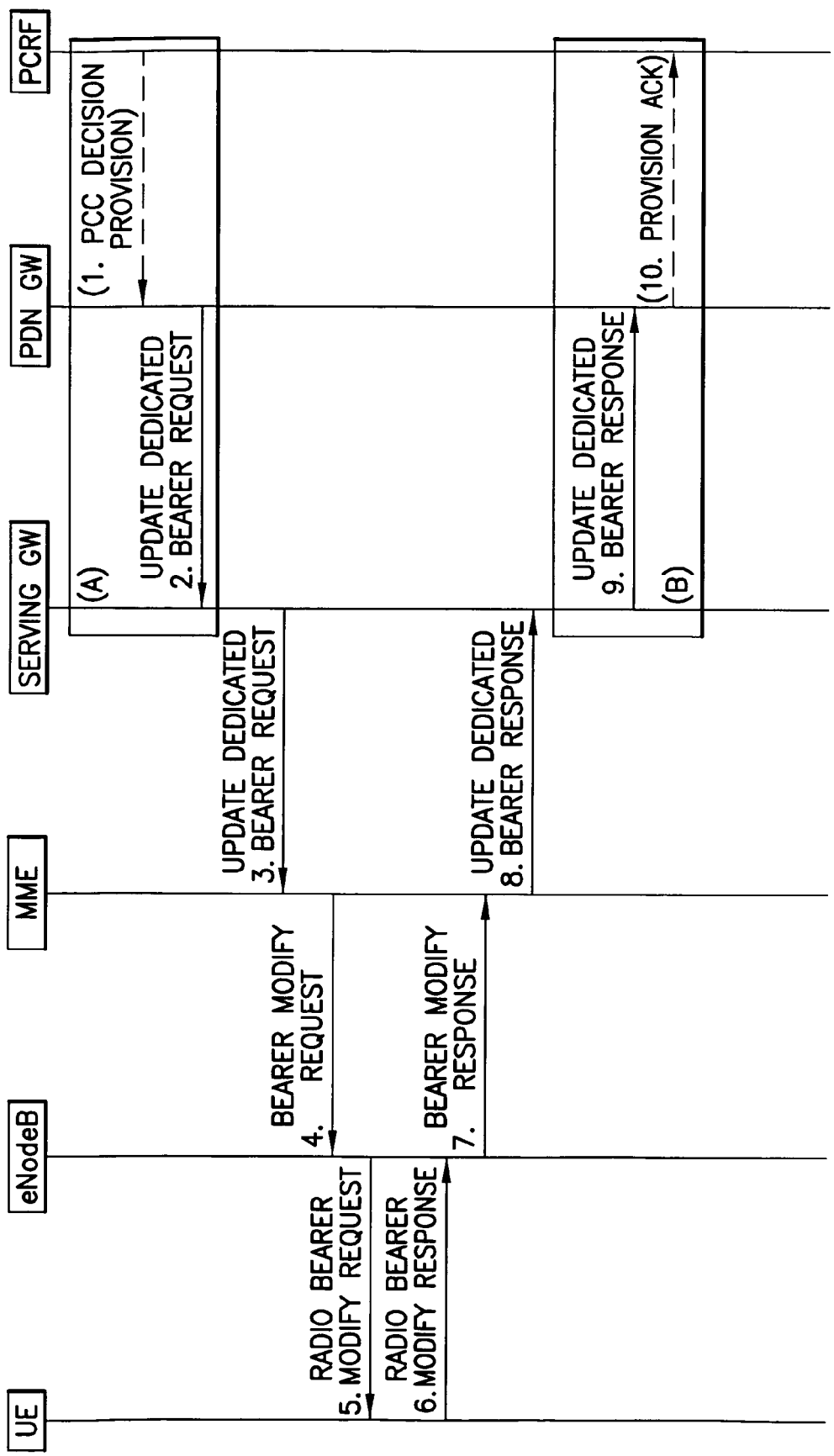
FIG. 3 is a signaling diagram similar to FIG. 5.4.2-1 of 3GPP TS 23.401 (v 1.3.0) with specific signaling according to an embodiment of the invention.

FIG. 3: Dedicated Bearer Modification Procedure with Bearer QoS Update, UE in Active Mode. According to aspects of this invention, TS 23.401 section 5.4.2 Dedicated bearer modification with bearer QoS update is amended by the bolded text below to read as follows with reference to FIG. 3:

NOTE: Steps 3-8 are common for architecture variants with GTP based S5/S8 and PMIP-based S5/S8. For an PMIP-based S5/S8, procedure steps (A) and (B) are defined in 3GPP TS 23.402[2]. Steps 1, 2, 9 and 10 concern GTP based S5/S8.

1. If dynamic PCC is not deployed, the PCRF sends a PCC decision provision (QoS policy) message to the PDN GW. If dynamic PCC is not deployed, the PDN GW may apply local QoS policy.

2. The PDN GW uses this QoS policy to determine that a service data flow shall be aggregated to or removed from an active dedicated bearer. The PDN GW generates the UL TFT and updates the Bearer QoS to match the aggregated set of service date flows. The PDN GW then sends the Update Dedicated Bearer Request (PTI, EPS Bearer Identity, Bearer QoS, UL TFT) message to the Serving GW. The Procedure Transaction Id (PTI) parameter is only used when the procedure was initiated by a UE Requested Bearer Resource Allocation Procedure—see clause 5.4.5.

3. The Serving GW sends the Update Dedicated Bearer Request (EPS Bearer Identity, Bearer QoS, UL TFT) message to the MME.

4. The MME builds a Session Management Configuration IE including the UL TFT and EPS Bearer Identity. If the UE has UTRAN or GERAN capabilities, the MME uses the EPS bearer QoS information to derive the corresponding PDP context parameters QoS Negotiated (R99 QoS profile), Radio Priority and Packet Flow Id and includes them in the Session Management Configuration. If the UE indicated in the UE Network Capability it does not support BSS packet flow procedures, then the MME shall not include the Packet Flow Id. The MME then sends the Bearer Modify Request (EPS Bearer Identity, Bearer QoS, Session Management Configuration) message to the eNodeB.

5. The eNodeB maps the modified Bearer QoS to the Radio Bearer QoS. It then signals a Radio Bearer Modify Request (Radio Bearer QoS, Session Management Configuration, EPS RB Identity) message to the UE. The UE shall store the QoS Negotiated, Radio Priority, Packet Flow Id, which it received in the Session Management Configuration, for use when accessing via GERAN or UTRAN. The UE uses the uplink packet filter (UL TFT) to determine the mapping of service data flows to the radio bearer.

NOTE: The details of the Radio Bearer QoS are specified by RAN2.

6. The UE NAS layer builds a Session Management Response IE including EPS Bearer Identity. If the UE is 2G/3G capable, it also checks whether it is able to support a secondary PDP context corresponding to that dedicated EPS Bearer. The indication of secondary PDP context support is included in Session Management Response IE The UE then acknowledges the radio bearer modification to the eNodeB with a Radio Bearer Modify Response (Session Management Response).message.

7. The eNodeB acknowledges the bearer modification to the MME with a Bearer Modify Response (EPS Bearer Identity, Session Management Response) message. With this message, the eNodeB indicates whether the requested Bearer QoS could be allocated or not.

8. The MME acknowledges the bearer modification to the Serving GW by sending an Update Dedicated Bearer Response (EPS Bearer Identity) message.

The MME stores the information whether a secondary PDP context is supported for this dedicated EPS bearer. This information is used only in case of intersystem handover to 2G/3G network.

9. The Serving GW acknowledges the bearer modification to the PDN GW by sending an Update Dedicated Bearer Response (EPS Bearer Identity) message. [ . . . ]

10. If the dedicated Bearer modification procedure was triggered by a PCC Decision Provision message from the PCRF, the PDN GW indicates to the PCRF whether the requested PCC decision (QoS policy) could be enforced or not by sending a Provision Ack message.

NOTE: The exact signalling of step 1 and 10 (e.g. in case of local break-out) is outside the scope of this specification. This signalling and its interaction with the dedicated bearer activation procedure are to be specified in 3GPP TS 23.203 [6]. Steps 1 and 10 are included here only for completeness.

Figure 4:
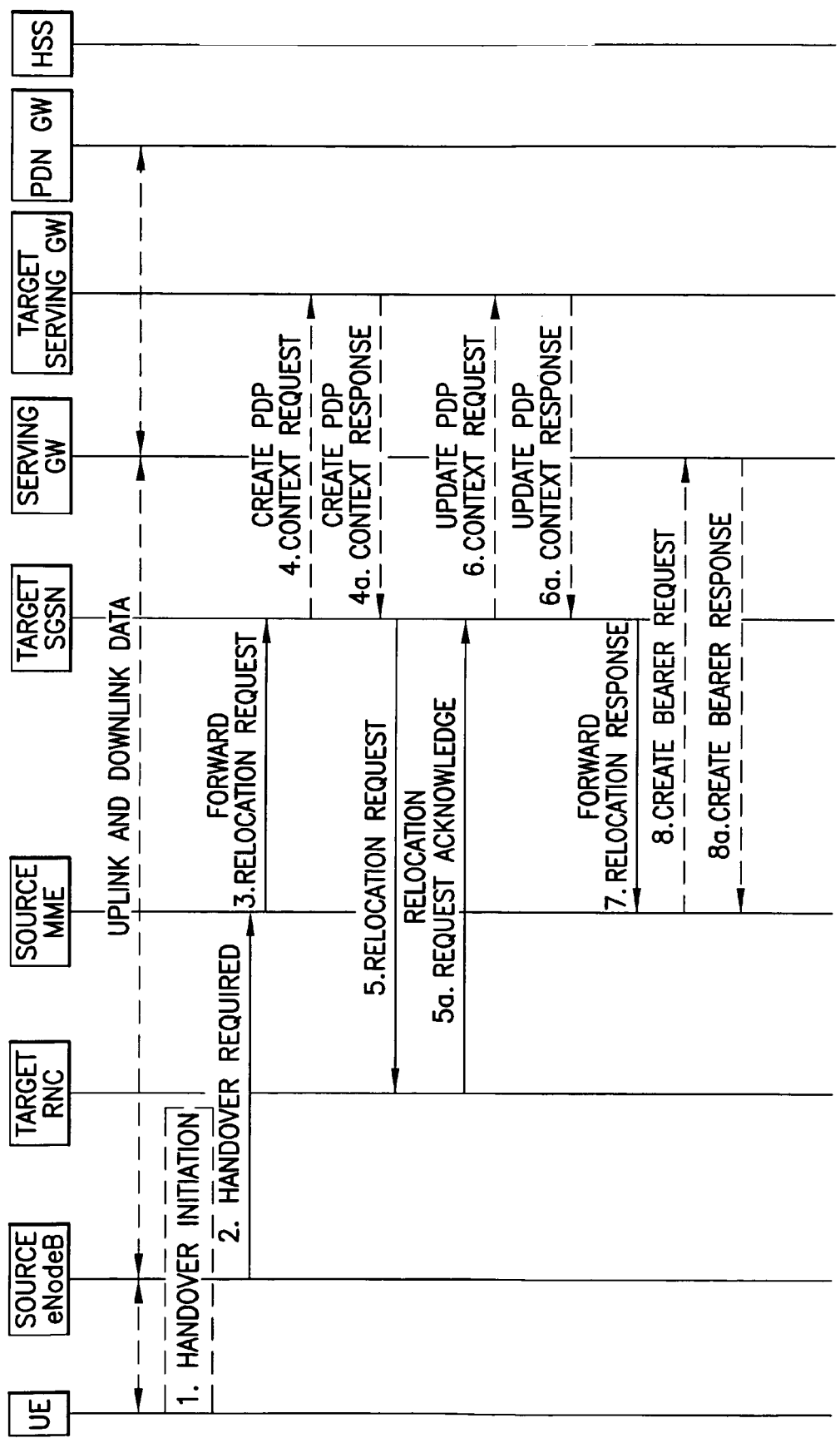
FIG. 4 is a signaling diagram similar to FIG. 5.5.2.1-1 of 3GPP TS 23.401 (v 1.3.0) with specific signaling according to an embodiment of the invention.

FIG. 4: E-UTRAN to UTRAN Iu mode Inter RAT HO, preparation phase. According to aspects of this invention, TS 23.401 section 5.5.2.1.2 Preparation Phase is amended by the bolded text below to read as follows with reference to FIG. 4:

1. The source eNodeB decides to initiate an Inter-RAT handover to the target access network, UTRAN Iu mode. At this point both uplink and downlink user data is transmitted via the following: Bearer(s) between UE and source eNodeB, GTP tunnel(s) between source eNodeB, Serving GW and PDN GW. (If solution 2 is in use, when the source eNB asks the UE to measure the cells under 2G/3G, the UE collects information of supported secondary PDP contexts and includes that as a NAS message in the measurement report. After that the UE sends the NAS message to the MME. (The NAS message not shown in the FIG. 5.5.2.1-1)

NOTE: The process leading to the handover decision is outside of the scope of this specification.

2. The source eNodeB sends a Handover Required (Cause, Target RNC Identifier, Source eNodeB Identifier, Source to Target Transparent Container, Bearers Requesting Data Forwarding List) message to the source MME to request the CN to establish resources in the target RNC, target SGSN and the Serving GW.

The 'Bearers Requesting Data Forwarding List' IE contains the list of bearers for which the source eNodeB decided that data forwarding (direct or indirect) is necessary.

3. The source MME determines from the 'Target RNC Identifier' IE that the type of handover is IRAT Handover to UTRAN Iu mode. The Source MME initiates the Handover resource allocation procedure by sending a Forward Relocation Request (IMSI, Target Identification, MM Context, PDP Context, PDP Context Prioritization, MME Tunnel Endpoint Identifier for Control Plane, MME Address for Control plane, Source to Target Transparent Container, S1-AP Cause Direct Forwarding Flag) message to the target SGSN. This message includes all PDP contexts corresponding to the bearers established in the source system and the uplink Tunnel endpoint parameters of the Serving GW. Note that the MME sends the list of the terminal supported PDP Contexts to the SGSN. It is FFS if the service data flows from the non-supported PDP contexts are transferred to relevant supported PDP context.

'Direct Forwarding Flag' IE indicates if Direct Forwarding of data to Target side shall be used or not. This flag is set by the source MME.

The MM context contains security related information, e.g. supported ciphering algorithms as described in 3GPP TS 29.060[14]. The relation between UTRAN and EPS security parameters is FFS.

Editor's note: This needs to be aligned with security requirements for Release 8. [ . . . ]

4. The target SGSN determines if the Serving GW is relocated, e.g., due to PLMN change. If the Serving GW is relocated, the target SGSN selects the target Serving GW as described under clause "GW selection function". The target SGSN sends a Create PDP Context Request message (IMSI, SGSN Tunnel Endpoint Identifier for Control Plane, SGSN Address for Control plane, PDN GW address(es) for user plane, PDN GW UL TEID(s) for user plane, PDN GW address(es) for control plane, and PDN GW TEID(s) for control plane) to the target Serving GW.

4a. The target Serving GW returns a Create PDP Context Response (Serving GW address(es) for user plane, Serving GW UL TEID(s) for user plane, Serving GW DL TEID(s) in case of indirect forwarding, Serving GW context ID) message to the target SGSN.

5. The target SGSN will request the target RNC to establish the radio network resources (RABs) by sending the message Relocation Request (UE Identifier, Cause, CN Domain Indicator, Integrity protection information (i.e. IK and allowed Integrity Protection algorithms), Encryption information (i.e. CK and allowed Ciphering algorithms), RAB to be setup list, Source to Target Transparent Container).

For each RAB requested to be established, RABs To Be Setup shall contain information such as RAB ID, RAB parameters, Transport Layer Address, and Iu Transport Association. The target SGSN shall not request resources for which the Activity Status Indicator within a PDP Context indicates that no active radio bearer exist on the source side for that PDP Context. The RAB ID information element contains the NSAPI value, and the RAB parameters information element gives the QoS profile. The Transport Layer Address is the Serving GW Address for user data, and the Iu Transport Association corresponds to the uplink Tunnel Endpoint Identifier Data.

Ciphering and integrity protection keys are sent to the target RNC to allow data transfer to continue in the new RAT/mode target cell without requiring a new AKA (Authentication and Key Agreement) procedure. Information that is required to be sent to the UE (either in the Relocation Command message or after the handover completion message) from RRC in the target RNC shall be included in the RRC message sent from the target RNC to the UE via the transparent container.

In the target RNC radio and Iu user plane resources are reserved for the accepted RABs.

5a. The target RNC allocates the resources and returns the applicable parameters to the target SGSN in the message Relocation Request Acknowledge (Target to Source Transparent Container, RABs setup list, RABs failed to setup list).

Upon sending the Relocation Request Acknowledge message the target RNC shall be prepared to receive downlink GTP PDUs from the Serving GW for the accepted RABs.

Each RAB to be setup is defined by a Transport Layer Address, which is the target RNC Address for user data, and the Iu Transport Association, which corresponds to the downlink Tunnel Endpoint Identifier for user data.

6. The target SGSN may sends an Update PDP Context Request message (IMSI, QoS Negotiated, SGSN Tunnel Endpoint Identifier for Control Plane, SGSN Address for Control plane, Target RNC Address and TEID(s) for DL user plane) to the target Serving GW. This message is sent to the target SGW if the SGW has changed.

6a. The (target) Serving GW returns a Update PDP Context Response (Cause) message to the target SGSN.

7. The target SGSN sends the message Forward Relocation Response (Cause, SGSN Tunnel Endpoint Identifier for Control Plane, SGSN Address for Control Plane, Target to Source Transparent Container, RANAP cause, RAB Setup Information, Additional RAB Setup Information, Address(es) and TEID(s) for User Traffic Data Forwarding) to the source MME.

If 'Direct Forwarding' is applicable, then the IE 'Address(es) and TEID(s) for User Traffic Data Forwarding' contains the GTP-U tunnel endpoint parameters to the Target RNC. Otherwise the IE 'Address(es) and TEID(s) for User Traffic Data Forwarding' may contain the GTP-U tunnel endpoint parameters to the Serving GW (or to the Target Serving GW in case of re-location).

8. If the "Direct Forwarding" is not applicable, the Source MME shall send the message Create Bearer Request (Cause, Address(es) and TEID(s) for Data Forwarding (see Step 7), NSAPI(s)) to the Serving GW used for indirect packet forwarding. The Cause shall indicate that the bearer is subject to data forwarding.

Indirect forwarding may be performed via a Serving GW which is different from the Serving GW used as the anchor point for the UE.

8a. The Serving GW returns the forwarding parameters by sending the message Create Bearer Response (Cause, Serving GW Address(es) and TEID(s) for Data Forwarding). If the Serving GW doesn't support data forwarding, an appropriate cause value shall be returned and the Serving GW Address(es) and TEID(s) will not be included in the message.

Figure 5B:
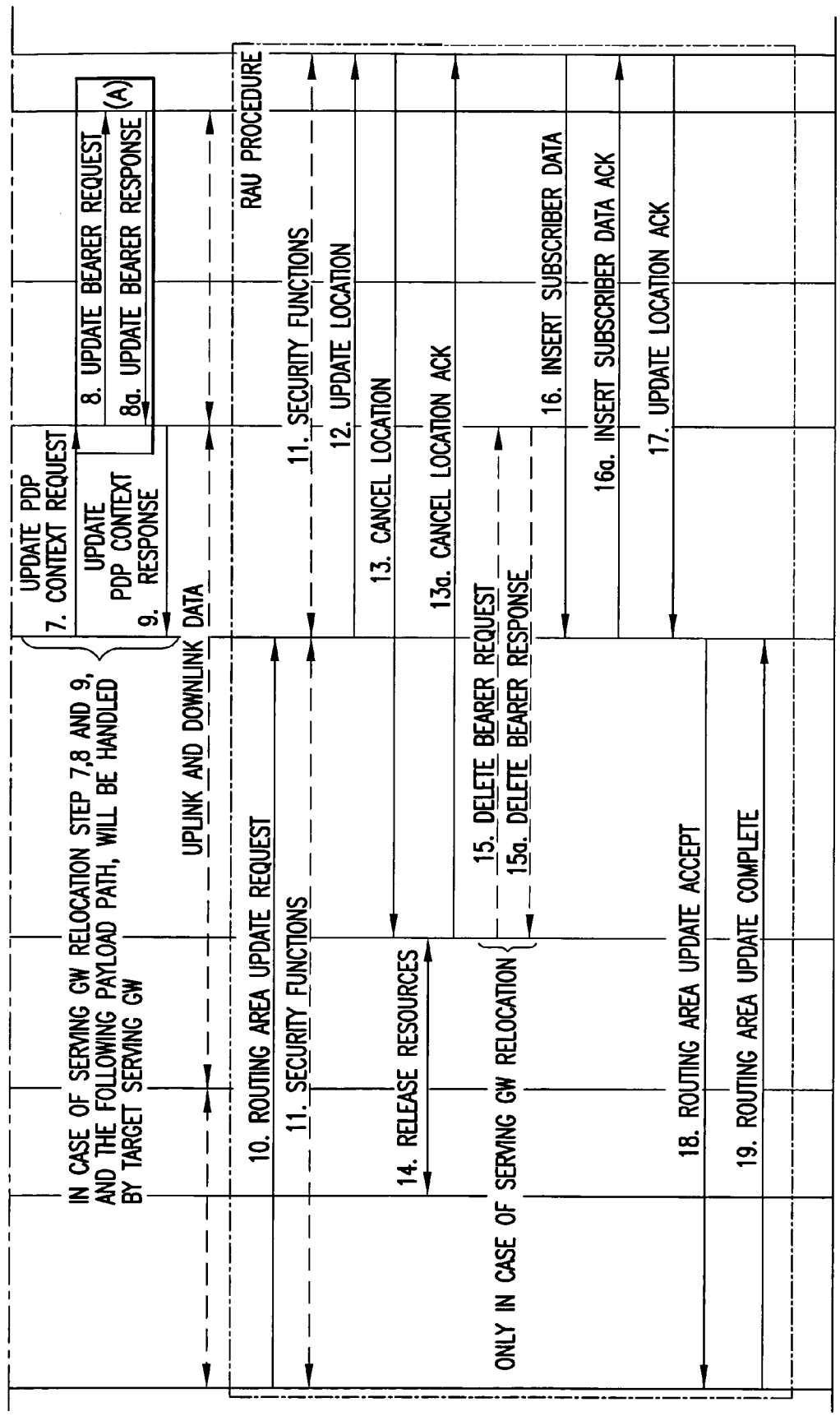
FIG. 5 is a signaling diagram similar to FIG. 5.5.2.1-2 of 3GPP TS 23.401 (v 1.3.0) with specific signaling according to an embodiment of the invention.

FIG. 5: E-UTRAN to UTRAN Iu mode Inter RAT HO, execution phase. According to aspects of this invention, TS 23.401 section 5.5.2.1.3 Execution Phase is amended by the bolded text below to read as follows with reference to FIG. 5:

NOTE: For a PMIP-based S5/S8, procedure steps (A) are defined in 3GPP TS 23.402[2]. Steps 8 and 8a concern GTP based S5/S8

The source eNodeB continues to receive downlink and uplink user plane PDUs.

1. The source MME completes the preparation phase towards source eNodeB by sending the message Handover Command (Target to Source Transparent Container, Bearers Subject to Data Forwarding List). The "Bearers Subject to Data forwarding list" IE may be included in the message and it shall be a list of 'Address(es) and TEID(s) for user traffic data forwarding' received from target side in the preparation phase (Forward Relocation Response message).

The source eNodeB initiates data forwarding for bearers specified in the "Bearers Subject to Data Forwarding List". The data forwarding may go directly to target RNC or alternatively go via the Serving GW if so decided by source MME and or/target SGSN in the preparation phase.

2. The source eNodeB will give a command to the UE to handover to the target access network via the message HO from E-UTRAN Command. This message includes a transparent container including radio aspect parameters that the target RNC has set-up in the preparation phase. The details of this E-UTRAN specific signalling are described in 3GPP TS 36.300[5].

Upon the reception of the HO from E-UTRAN Command message containing the Handover Command message, the UE shall associate its bearer IDs to the respective RABs based on the relation with the NSAPI and shall suspend the uplink transmission of the user plane data.

3. The source eNodeB informs the source MME which then informs the target SGSN regarding "delivery order" parameters in the message Forward SRNS Context. The Target SGSN forwards the SRNS Context to the Target RNC.

[ . . . ]

4. The UE moves to the target UTRAN Iu (3G) system and executes the handover according to the parameters provided in the message delivered in step 2. The procedure is the same as in step 6 and 8 in subclause 5.2.2.2 in 3GPP TS 43.129[8] with the additional function of association of the received RABs and existing Bearer Id related to the particular NSAPI. [ . . . ]

The UE may resume the user data transfer only for those NSAPIs for which there are radio resources allocated in the target RNC.

5. When the new source RNC-ID+S-RNTI are successfully exchanged with the UE, the target RNC shall send the Relocation Complete message to the target SGSN. The purpose of the Relocation Complete procedure is to indicate by the target RNC the completion of the relocation of the source E-UTRAN to the EPC. After the reception of the Relocation Complete message the target SGSN shall be prepared to receive data from the target RNC. Each uplink N-PDU received by the target SGSN is forwarded directly to the Serving GW.

6. Then the target SGSN knows that the UE has arrived to the target side and target SGSN informs the source MME by sending the message Forward Relocation Complete. The source MME will also acknowledge that information. A timer may be started to supervise when resources in Source eNodeB and Source Serving GW (in case of Serving GW relocation) shall be released (normally this will occur when Source MME receives the message Cancel Location from HSS). Further action in the source MME continues at step 13.

7. The target SGSN will now complete the Handover procedure by informing the Serving GW (for Serving GW relocation this will be the Target Serving GW) that the target SGSN is now responsible for all the PDP Context the UE have established. This is performed in the message Update PDP Context Request (SGSN Tunnel Endpoint Identifier for Control Plane, NSAPI(s), SGSN Address for Control Plane, SGSN Address(es) and TEID(s) or RNC Address(es) and TEID(s) for User Traffic, and RAT type).

8. The Serving GW (for Serving GW relocation this will be the Target Serving GW) may inform the PDN GW(s) the change of for example for Serving GW relocation or the RAT type that e.g. can be used for charging, by sending the message Update Bearer Request. This message includes TEIDs and NSAPIs for the PDP contexts accepted by the target network and the terminal. The PDN GW must acknowledge the request with the message Update Bearer Response. The PDN GW may indicate how the active service data flows are mapped to the current set of PDP contexts in the Update Bearer Request (NSAPI, TFT).

9. The Serving GW (for Serving GW relocation this will be the Target Serving GW) acknowledges the user plane switch to the target SGSN via the message Update PDP Context Response (Cause, Serving GW Tunnel Endpoint Identifier for Control Plane, Serving GW Address for Control Plane, Protocol Configuration Options, and TFTs for each active PDP context.). At this stage the user plane path is established for all PDP contexts between the UE, target RNC, Serving GW (for Serving GW relocation this will be the Target Serving GW) and PDN GW.

To map UL traffic to the right PDP contexts, the terminal may decide the mapping internally, or the PDN GW mapping is given to the terminal. [ . . . ] If SGSN should signal the TFT mapping to the terminal, this requires a new message, or a new information element to an existing message. [ . . . ].

10. The UE sends a Routing Area Update Request message to the target SGSN informing it that the UE is located in a new routing area. The UE shall send this message immediate after step 4a.

The target SGSN knows that an IRAT Handover has been performed for this UE and can therefore exclude the context procedures between source MME and target SGSN which normally are used within the RA Update procedure.

11. At this point the target SGSN may optionally invoke security function. The security function can be deferred and performed at any later time as well. Procedures are defined in the clause "Security Function".

12. The target SGSN informs the HSS of the change of CN node by sending Update Location (SGSN Number, SGSN Address, IMSI) message to the HSS.

13. The HSS sends a Cancel Location (IMSI, Cancellation Type) message to the source MME with Cancellation Type set to Update Procedure. The source MME acknowledges with a Cancel Location Acknowledge (IMSI) message. This message allows the source MME to release the bearer(s) in the Serving GW by sending a Delete Bearer Request message. In case the Serving GW is not relocated, only the signalling relationship is released between the Serving GW and the source MME, but the UE context continues to exist in the Serving GW. If resources for indirect forwarding have been allocated, those shall also be released at this point.

14. After the source MME has received the Cancel Location message or the timer started at Step 6a) expires, Source MME sends a Release Resources message to the Source eNodeB. When the Release Resources message has been received and there is no longer any need for the eNodeB to forward data, the Source eNodeB releases its resources.

15. This step is only performed in case of Serving GW relocation. When the source MME removes the MM context, the source MME deletes the EPS bearer resources by sending Delete Bearer Request (Cause, TEID) messages to the Source Serving GW. Cause indicates to the Source Serving GW that the Source Serving GW shall not initiate a delete procedure towards the PDN GW. The Source Serving GW acknowledges with Delete Bearer Response (TEID) messages.

16. The HLR sends Insert Subscriber Data (IMSI, Subscription data) message to the target SGSN. The target SGSN validates the UE presence in the new RA. If all checks are successful for the UE the target SGSN returns an Insert Subscriber Data Acknowledge (IMSI) message to the HLR.

17. The HSS acknowledges the Update Location by returning an Update Location Ack (IMSI) message to the target SGSN.

18. The target SGSN validates the UE presence in the new RA. If the UE is allowed to be attached in this RA, the target SGSN updates the MM context and sends a Routing Area Update Accept (P-TMSI, TMSI, P-TMSI signature, etc.) message to the UE.

19. The UE confirms the re-allocation of the new P-TMSI by responding to the target SGSN with a Routing Area Update Complete message. 5.5.2.2 UTRAN Iu mode to E-UTRAN Inter RAT handover FIG. 6: UTRAN Iu mode to E-UTRAN Inter RAT HO, preparation phase. According to aspects of this invention, TS 23.401 section 5.5.2.2.2 Preparation Phase would remain as follows with reference to FIG. 6:

1. The source RNC decides to initiate an Inter-RAT handover to the E-UTRAN. At this point both uplink and downlink user data is transmitted via the following: Bearers between UE and source RNC, GTP tunnel(s) between source RNC, Serving GW and PDN GW.

NOTE: The process leading to the handover decision is outside of the scope of this specification.

2. The source RNC sends a Relocation Required (Cause, Target eNodeB Identifier, Source RNC Identifier, Source to Target Transparent Container, Bearers Requesting Data Forwarding List) message to the source SGSN to request the CN to establish resources in the target eNodeB, Target MME and the Serving GW. The 'Bearers Requesting Data Forwarding List' IE contains that list of RABs for which the source RNC decided that data forwarding (direct or indirect) is necessary.

3. The source SGSN determines from the 'Target eNodeB Identifier' IE that the type of handover is IRAT Handover to E-UTRAN. The Source SGSN initiates the Handover resource allocation procedure by sending Forward Relocation Request (IMSI, Target Identification, MM Context, PDP Context, PDP Context Prioritization, SGSN Tunnel Endpoint Identifier for Control Plane, SGSN Address for Control plane, Source to Target Transparent Container, Direct Forwarding Flag) message to the target MME. This message includes all PDP contexts corresponding to all the bearers established in the source system and the uplink Tunnel endpoint parameters of the Serving GW.

The 'Direct Forwarding Flag' IE indicates if Direct Forwarding of data to Target side shall be used or not. This flag is set by the source SGSN.

The MM context contains security related information, e.g. supported ciphering algorithms as described in 3GPP TS 29.060[14]. [ . . . ]

The target MME selects the ciphering algorithm to use. This algorithm will be sent transparently from the target eNodeB to the UE in the Target to Source Transparent Container (EPC part).

[ . . . ]

4. The target MME determines if the Serving GW is relocated, e.g., due to PLMN change. If the Serving GW is relocated, the target MME selects the target Serving GW as described under clause "GW selection function". The target MME sends a Create Bearer Request message (IMSI, MME context ID, MME Tunnel Endpoint Identifier for Control Plane, MME Address for Control plane, PDN GW address(es) for user plane, PDN GW UL TEID(s) for user plane, PDN GW address for control plane, and PDN GW TEID(s) for control plane) to the target Serving GW.

4a. The target Serving GW returns a Create Bearer Response (Serving GW address(es) for user plane, Serving GW UL TEID(s) for user plane, Serving GW DL TEID(s) in case of indirect forwarding, Serving GW context ID) message to the target MME.

5. The target MME will request the target eNodeB to establish the bearer(s) by sending the message Handover Request (UE Identifier, Cause, CN Domain Indicator, Integrity protection information (i.e. IK and allowed Integrity Protection algorithms), Encryption information (i.e. CK and allowed Ciphering algorithms), EPS Bearers to be setup list, Source to Target Transparent Container).

For each EPS bearer requested to be established, 'EPS Bearers To Be Setup' IE shall contain information such as ID, bearer parameters, Transport Layer Address, and S1 Transport Association. The Transport Layer Address is the Serving GW Address for user data, and the S1 Transport Association corresponds to the uplink Tunnel Endpoint Identifier Data.

The ciphering and integrity protection keys will be sent transparently from the target eNodeB to the UE in the Target to Source Transparent Container, and in the message HO from UTRAN Command from source RNC to the UE. This will then allow data transfer to continue in the new RAT/mode target cell without requiring a new AKA (Authentication and Key Agreement) procedure.

5a. The target eNodeB allocates the request resources and returns the applicable parameters to the target MME in the message Handover Request Acknowledge (Target to Source Transparent Container, EPS Bearers setup list, EPS Bearers failed to setup list). Upon sending the Handover Request Acknowledge message the target eNodeB shall be prepared to receive downlink GTP PDUs from the Serving GW for the accepted EPS bearers.

6. The target MME may send an Update Bearer Request message (IMSI, MME context ID, Target eNodeB Address and TEID(s) for DL user plane,) to the target Serving GW.

6a. The target Serving GW returns an Update Bearer Response (Cause) message to the target MME.

7. The target MME sends the message Forward Relocation Response (Cause, List of Set Up RABs, MME Tunnel Endpoint Identifier for Control Plane, S1-AP cause, MME Address for control plane, Target to Source Transparent Container, Address(es) and TEID(s) for Data Forwarding) to the source SGSN.

If 'Direct Forwarding' is applicable, then the IEs 'Address(es) and TEID(s) for Data Forwarding' contains the GTP-U tunnel endpoint parameters to the eNodeB. Otherwise the IEs 'Address(es) and TEID(s) for Data Forwarding' may contain the GTP-U tunnel endpoint parameters to the Serving GW (or to the Target Serving GW for re-location).

8. If "Direct Forwarding" is not applicable, the source SGSN shall send the message Create Bearer Request (Cause, Address(es) and TEID(s) for Data Forwarding (see Step 7), NSAPI(s)) to the Serving GW used for indirect packet forwarding. The Cause shall indicate that the Bearer is subject to data forwarding.

Indirect forwarding may be performed via a Serving GW which is different from the Serving GW used as the anchor point for the UE.

8a. The Serving GW returns the forwarding user plane parameters by sending the message Create Bearer Response (Cause, Serving GW Address(es) and TEID(s) for Data Forwarding). If the Serving GW doesn't support data forwarding, an appropriate cause value shall be returned and the Serving GW Address(es) and TEID(s) will not be included in the message.

Figure 7B:
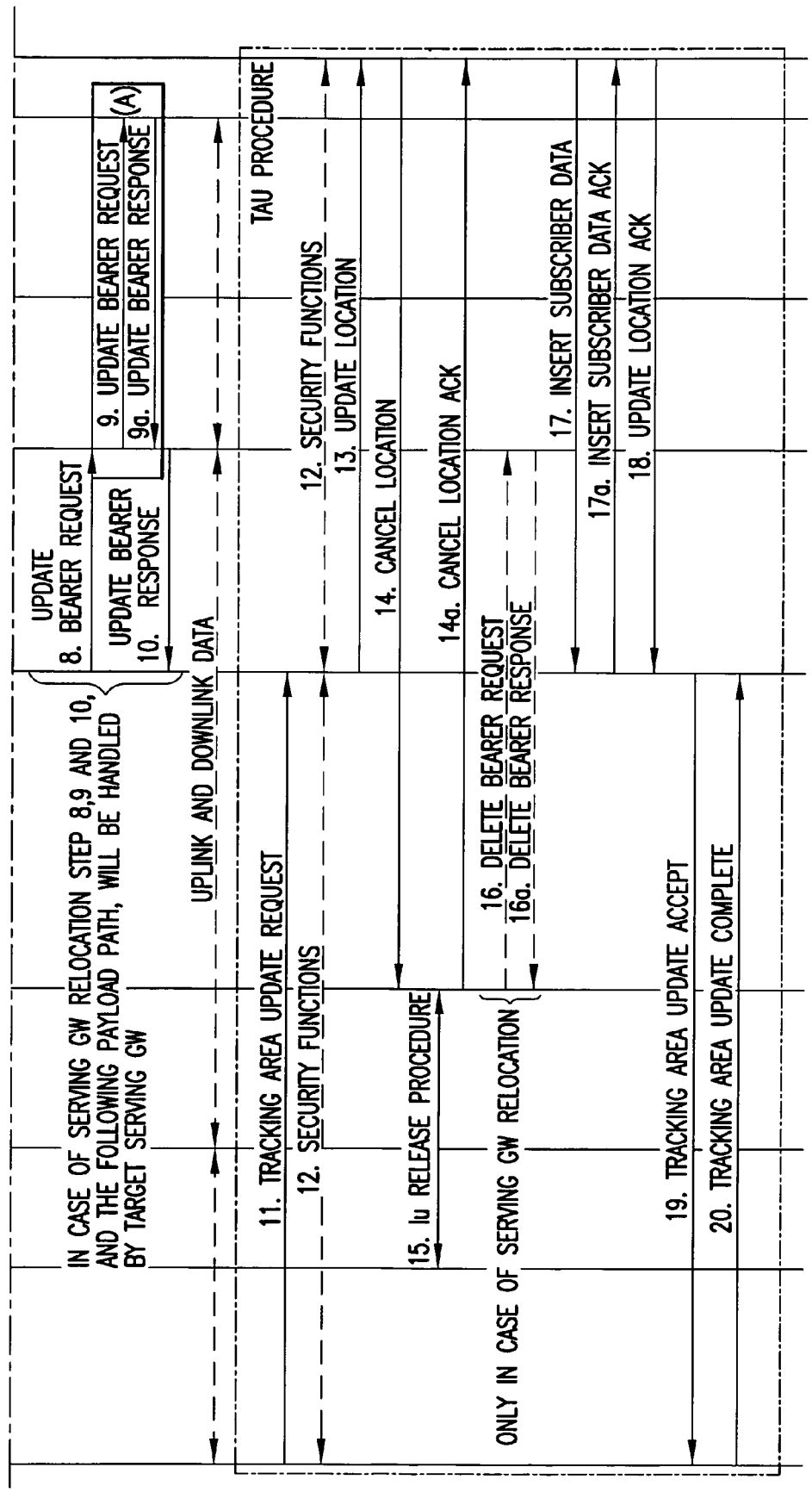
FIG. 7 is a signaling diagram similar to FIG. 5.5.2.2-2 of 3GPP TS 23.401 (v 1.3.0) with specific signaling according to an embodiment of the invention.

FIG. 7: UTRAN Iu mode to E-UTRAN Inter RAT HO, preparation phase. According to aspects of this invention, TS 23.401 section 5.5.2.2.3 Execution Phase is amended by the bolded text below to read as follows with reference to FIG. 7:

NOTE: For a PMIP-based S5/S8, procedure steps (A) are defined in 3GPP TS 23.402[2]. Steps 9 and 9a concern GTP based S5/S8

The source RNC continues to receive downlink and uplink user plane PDUs.

1. The source SGSN completes the preparation phase towards source RNC by sending the message Relocation Command (Target to Source Transparent Container, RABs to be Released List, RABs Subject to Data Forwarding List). The "RABs to be Released list" IE will be the list of all NSAPIs (RAB Ids) for which a Bearer was not established in Target eNodeB. The "RABs Subject to Data forwarding list" IE may be included in the message and it shall be a list of 'Address(es) and TEID(s) for user traffic data forwarding' received from target side in the preparation phase (Forward Relocation Response message).

2. The source RNC will command to the UE to handover to the target eNodeB via the message HO from UTRAN Command. The access network specific message to UE includes a transparent container including radio aspect parameters that the target eNodeB has set-up in the preparation phase. [ . . . ]

The source RNC may initiate data forwarding for the indicated RABs/PDP contexts specified in the "RABs Subject to Data Forwarding List". The data forwarding may go directly to target eNodeB, or alternatively go e.g. via the Serving GW if so decided by source SGSN and/or target MME in the preparation phase.

Upon the reception of the HO from UTRAN Command message containing the Relocation Command message, the UE shall associate its RAB IDs to the respective bearers ID based on the relation with the NSAPI and shall suspend the uplink transmission of the user plane data.

3. The Source RNC may inform the Source SGSN which then informs the Target MME regarding "delivery order" parameters in the message Forward SRNS Context.

The target MME forwards the SRNS Context to eNodeB.

[ . . . ]

4. The UE moves to the E-UTRAN and performs access procedures toward target eNodeB.

5. When the UE has got access to target eNodeB it sends the message HO to E-UTRAN Complete. This message includes NAS container/information element that includes UL TFTs and mapping to the corresponding bearer.

6. When the UE has successfully accessed the target eNodeB, the target eNodeB informs the target MME by sending the message Handover Notify. This message includes information element with UL TFTs.

7. Then the target MME knows that the UE has arrived to the target side and target MME informs the source SGSN by sending the message Forward Relocation Complete. The source SGSN will also acknowledge that information. A timer may be started to supervise when resources in the in Source RNC and Source Serving GW (in case of Serving GW relocation) shall be released (normally this will occur when Source SGSN receives the message Cancel Location from HSS). Further action in the source SGSN continues at step 14.

8. The target MME will now complete the Inter-RAT Handover procedure by informing the Serving GW (for Serving GW relocation this will be the Target Serving GW) that the target MME is now responsible for all the bearers the UE have established. This is performed in the message Update Bearer Request (Cause, MME Tunnel Endpoint Identifier for Control Plane, NSAPI, UL TFT, MME Address for Control Plane, eNodeB Address(es) and TEID(s) for User Traffic, and RAT type).

9. The Serving GW (for Serving GW relocation this will be the Target Serving GW) may inform the PDN GW the change of for example for Serving GW relocation or the RAT type that e.g. can be used for charging, by sending the message Update Bearer Request. This message includes IE with UL TFTs. The PDN GW must acknowledge the request with the message Update Bearer Response.

10. The Serving GW (for Serving GW relocation this will be the Target Serving GW) acknowledges the user plane switch to the target MME via the message Update Bearer Response (Cause, Serving GW Tunnel Endpoint Identifier for Control Plane, Serving GW Address for Control Plane, Protocol Configuration Options). At this stage the user plane path is established for all bearers between the UE, target eNodeB, Serving GW (for Serving GW relocation this will be the Target Serving GW) and PDN GW.

11. The UE sends a Tracking Area Update Request message to the target MME informing it that the UE is located in a new tracking area. The UE shall send this message immediately after message 5.
The target MME knows that an IRAT Handover has been performed for this UE and can therefore exclude the context procedures between source SGSN and target MME which normally are used within the TA Update procedure.

12. At this point the target MME may optionally invoke security function. The security function can be deferred and performed at any later time as well. Procedures are defined in the clause "Security Function".

13. The target MME informs the HSS of the change of CN node by sending Update Location (MME Address, IMSI) message to the HSS.

14. The HSS sends a Cancel Location (IMSI, Cancellation Type) message to the source SGSN with Cancellation Type set to Update Procedure. The source SGSN acknowledges with a Cancel Location Acknowledge (IMSI) message. This message allows the source SGSN to release the bearer(s) in the Serving GW by sending a Delete Bearer Request message. In case the Serving GW is not re-located, only the signalling relationship is released between the Serving GW and the source SGSN, but the UE context continues to exist in the Serving GW. If resources for indirect forwarding have been allocated, those shall also be released at this point.

15. After step 7 the source SGSN will clean-up all its resources towards source RNC by performing the Iu Release procedures. When there is no longer any need for the RNC to forward data, the source RNC responds with an Iu Release Complete message.

16. This step is only performed in case of Serving GW relocation. When the source SGSN removes the MM context, the source SGSN deletes the EPS bearer resources by sending Delete Bearer Request (Cause, TEID) messages to the Source Serving GW. Cause indicates to the Source Serving GW that the Source Serving GW shall not initiate a delete procedure towards the PDN GW. The Source Serving GW acknowledges with Delete Bearer Response (TEID) messages.

17. The HLR sends Insert Subscriber Data (IMSI, Subscription data) message to the target MME. The target MME validates the UE presence in the new TA. If all checks are successful for the UE the target MME returns an Insert Subscriber Data Acknowledge (IMSI) message to the HLR.

18. The HSS acknowledges the Update Location by returning an Update Location Ack (IMSI) message to the target MME.

19. The target MME validates the UE presence in the new TA. If the UE is allowed to be attached in this TA, the target MME updates the MM context and sends a Tracking Area Update Accept (S-TMSI, TMSI, TA-List, etc.) message to the UE.

20. The UE confirms the re-allocation of the new S-TMSI by responding to the target MME with a Tracking Area Update Complete message.

As can be seen from the above specific implementation then, for the case where a ISHO is from a 2G/3G network to a LTE network for dedicated bearer activation (FIG. 2), the dedicated bearers are set up as is currently understood, and the eNode B sends a radio bearer setup request message to the UE that carries the radio bearer QoS and the RB identities. The UE stores this, builds a session management response IE that has the bearer identity, checks whether it can support a secondary PDP context, and sends a radio bearer setup response message to the eNode B that carries the session management response IE and also which indicates the supported secondary PDP context. Substantively the same occurs for dedicated bearer modification procedure with QoS update (FIG. 3), but the messages are radio bearer modify request from eNode B to UE and radio bearer modify response from UE to eNode B in reply. In both instances, the message from the ME to the serving gateway GW (either create dedicated bearer response for FIG. 2 or update dedicated bearer response for FIG. 3) informs of the secondary PDP context that is supported by the UE, in the case where the ISHO is from a 2G/3G network to a LTE network.

As can be seen at FIG. 4 during the ISHO preparation phase, for the case where solution 2 above is used the source eNode B sends to the UE a request to measure the cells under 2G/3 G, the UE collects information of supported secondary PDP contexts and includes that as a NAS message in the measurement report (which occurs prior to Handover initiation of FIG. 4). The source MME sends the list of terminal supported PDP contexts to the target SGSN in a forward relocation request, and further the target SGSN sends to the target serving GW (if the serving gateway is changed in the handover) the QoS negotiated information in an update PDP context request message. In the handover execution phase as seen at FIG. 5, the serving GW sends to the PDN GW in an update bearer request message the TEIDs and NSAPIs for the PDPD contexts accepted by the target network and the terminal/UE, an the PDP GW may acknowledge how the active data service flows are mapped to the current set of PDP contexts I the update bearer request response. The serving GW sends an update PDP context response message that includes TFTs for each active PDP context. The mapping may be decided by the terminal/UE, or alternatively the PDP GW mapping may be given to the terminal/UE.

Figure 6:
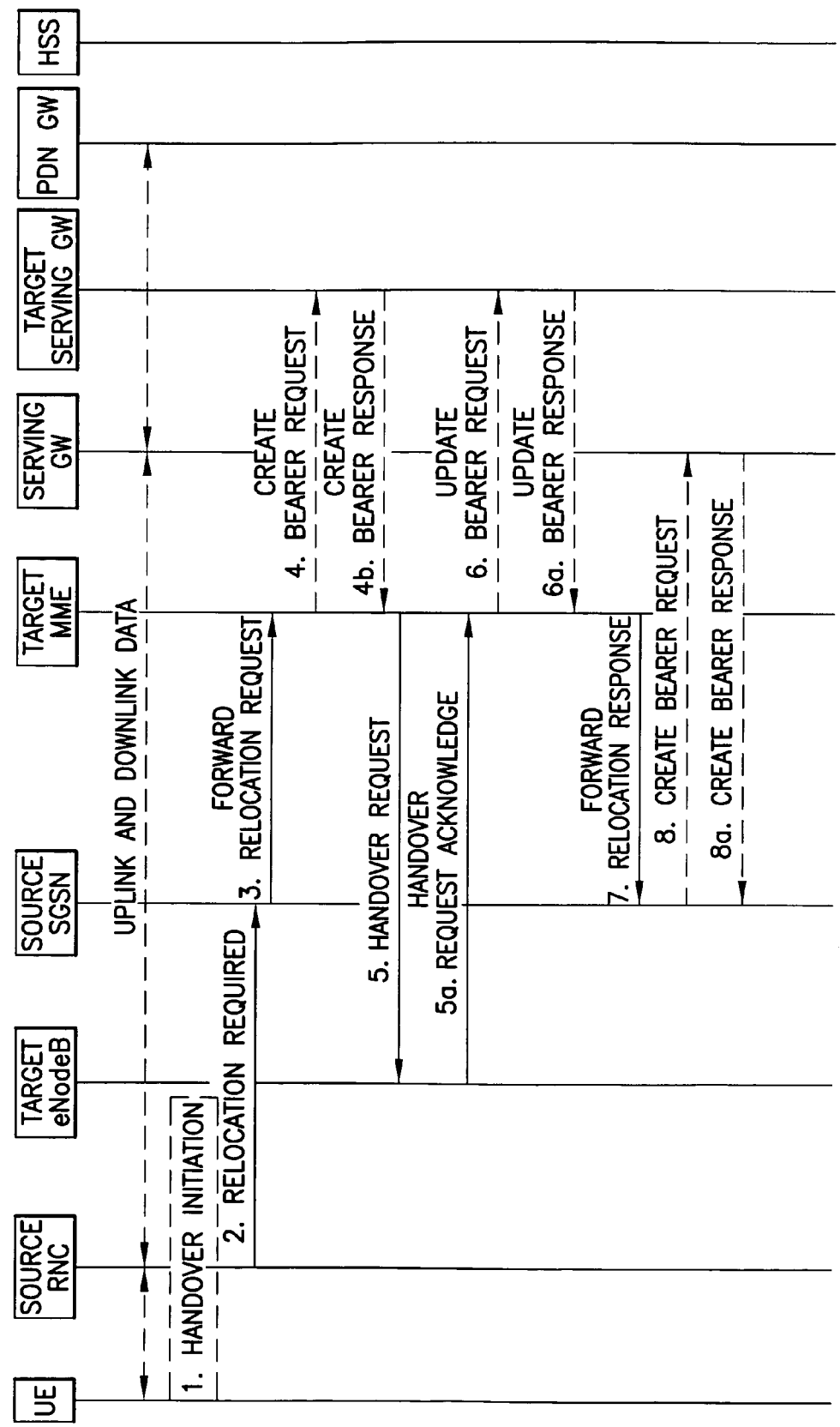
FIG. 6 is a signaling diagram similar to FIG. 5.5.2.2-1 of 3GPP TS 23.401 (v 1.3.0) with specific signaling according to an embodiment of the invention.

As can be seen in FIG. 6, there is no particular change by embodiments of this invention for the preparation phase signalling for an ISHO from 2G/3G to LTE, but in the execution phase shown in FIG. 7 there are up to four changes: the HO to E-UTRAN complete message from the UE to the target eNode B includes UL TFTs and mapping to the corresponding bearer; the handover notify message from the target eNode B to the target MME includes the UL TFTs; the update bearer request message from the target MME to the serving GW includes the UL TFT; and the update bearer request message from the serving GW to the PDN GW also includes the UL TFT.

Figure 8A:
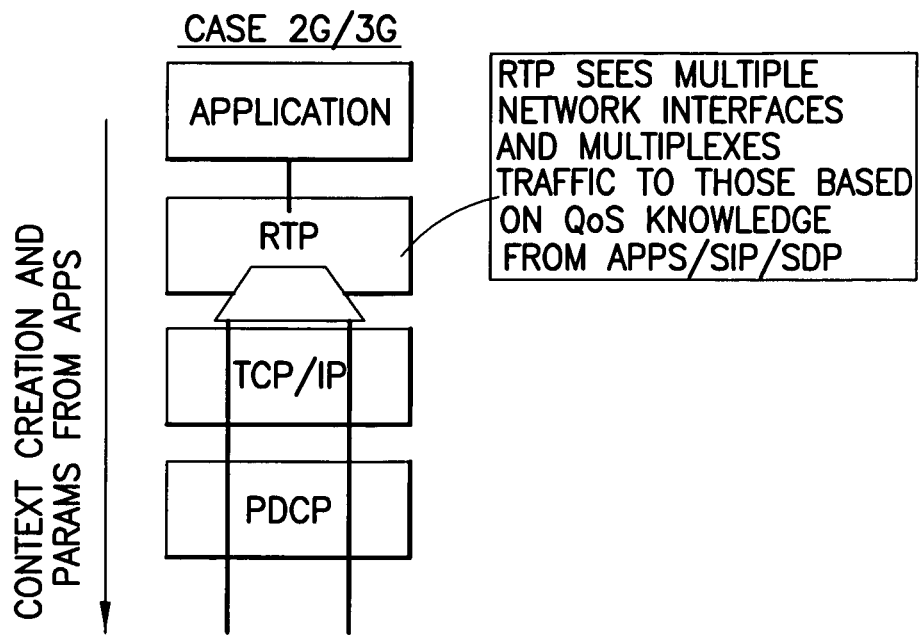
FIGS. 8A-8B are schematic logical layer diagrams of a terminal according to respective 2G/3G protocol and LTE protocol.
Figure 8B:
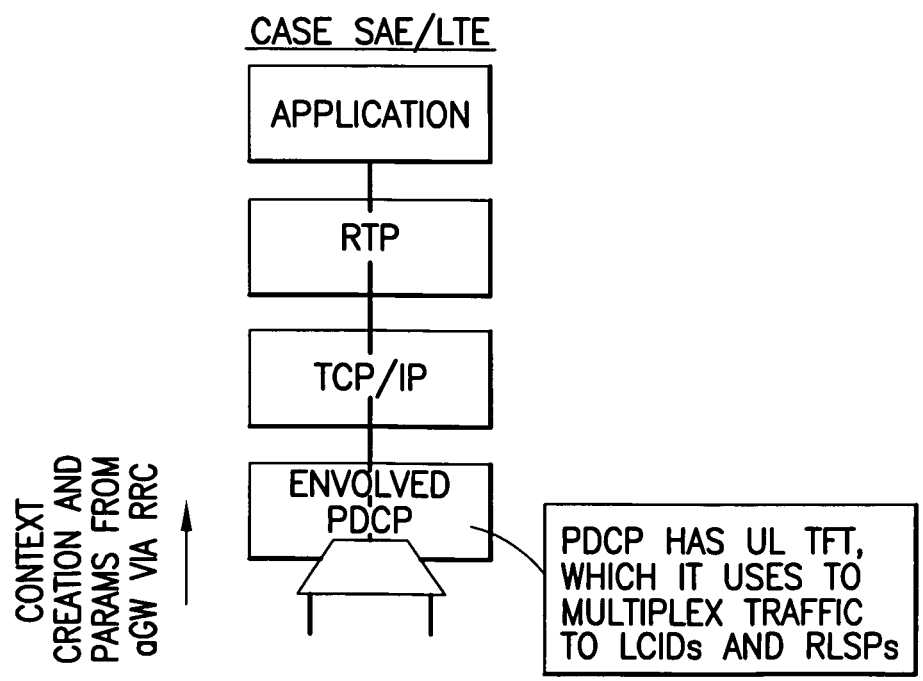

Due to the different context initiation schemes (in LTE terms, it may be considered analogous to the bearer initiation scheme) as detailed at FIGS. 8A-8B, a solution is presented thereafter to perform the inter-system HO gracefully. Consider a logical layer between the PDCP and the application layer of FIGS. 8A-8B as a 'connectivity layer'. At the QoS aware terminal (pre-LTE) of FIG. 8A, the application requires better QoS and makes a request. The request is processed in the cellular layer of the terminal to a secondary PDP context request, and the PDP context request is sent to the SGSN. The terminal (cellular layer) and application are aware of the requested QoS. When the secondary PDP context setup is ready, the SGSN sends a PDP context response-message to the terminal. The cellular layer is able to do mapping between the application and the secondary PDP context and informs the application about the status of QoS (reserved bit rate etc.).

FIG. 8B illustrates application behavior in an LTE terminal according to an embodiment of the invention. It is assumed that the application does not see a difference between 3G and LTE accesses. When the application notices that a better QoS is required, it sends the request as in 3G. The connectivity layer is aware of the current access technology. Because an LTE terminal is not allowed to request QoS, the connectivity layer stores the information of the requested QoS, but does not signal this information to the network. Application level signaling has caused the network to initiate resource reservation, and when that resource reservation is ready the application specific QoS information is given in a non-access stratum NAS message for the terminal in the radio bearer setup signaling. If the resource reservation fails, a direct transfer from the MME to the UE is used to transfer the failure information. The connectivity layer will always receive the information, and it is up to the applications and middleware if the information is used or not. The PDCP layer passes the NAS-message to the cellular layer, where the allocated QoS is bound to the matching application level request. The allocated QoS is given as a response for the requesting application. (From the application point of view this is the same as if a secondary PDP context response had arrived). The SAE/EPS bearers are not visible on the cellular layer, only the application specific QoS information is visible.

Figure 9:
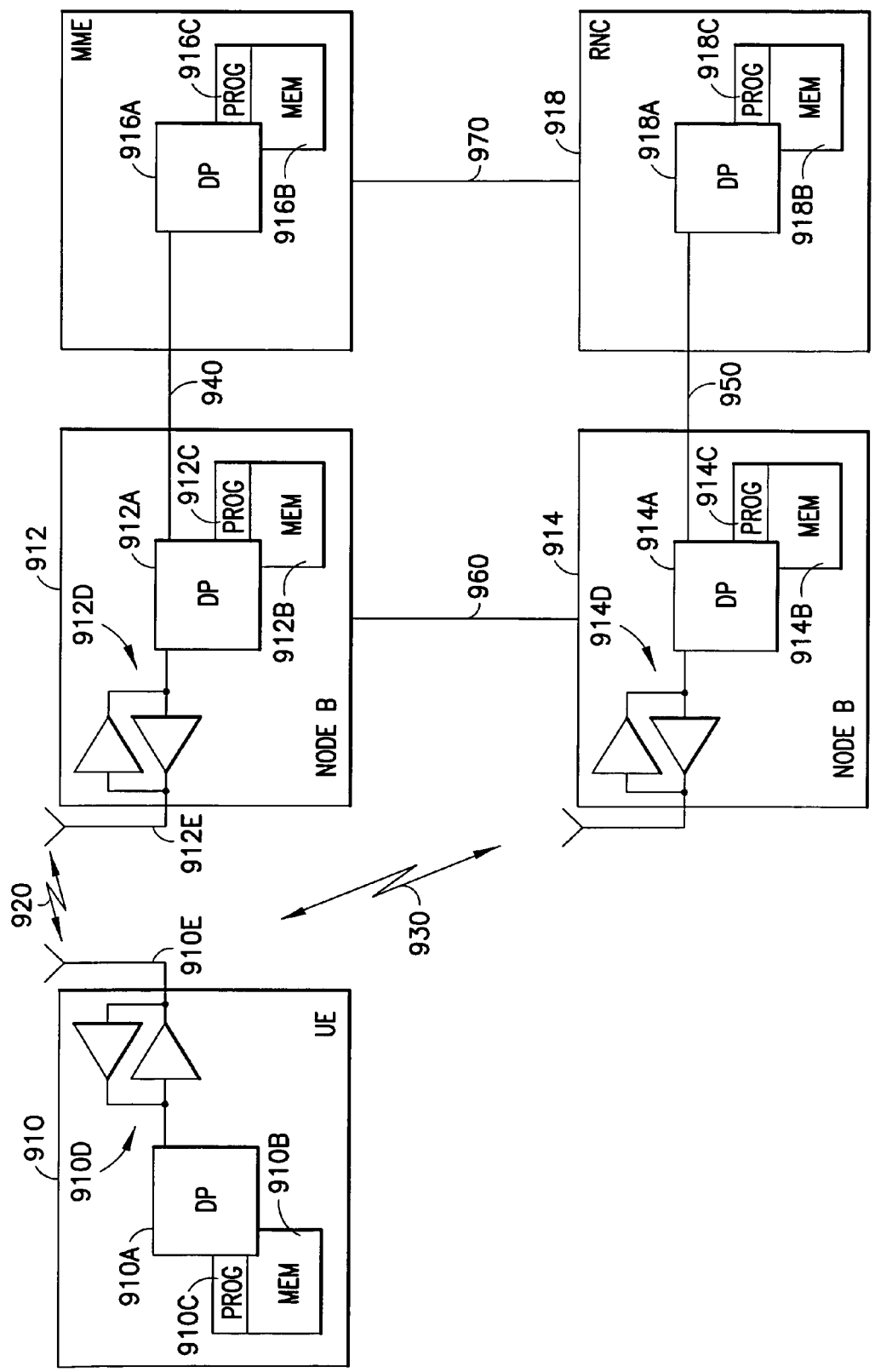
FIG. 9 shows a simplified block diagram of various electronic devices that are suitable for use in practicing the exemplary embodiments of this invention.

Reference is now made to FIG. 9 for illustrating a simplified block diagram of various electronic devices that are suitable for use in practicing the exemplary embodiments of this invention. In FIG. 9 a first wireless network is adapted for communication between a UE 910 and a Node B 912 (eNode B). The network may include a gateway GW/serving mobility entity MME/radio network controller RNC 916 or other radio controller function known by various terms in different wireless communication systems. The UE 910 includes a data processor (DP) 910A, a memory (MEM) 910B that stores a program (PROG) 910C, and a suitable radio frequency (RF) transceiver 910D coupled to one or more antennas 910E (one shown) for bidirectional wireless communications over one or more wireless links 920 with the Node B 912.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 912 also includes a DP 912A, a MEM 912B, that stores a PROG 912C, and a suitable RF transceiver 912D coupled to one or more antennas 912E. The Node B 912 may be coupled via a data path 940 (e.g., Iub or S1 interface) to the serving or other GW/MME/RNC 916. The GW/MME/RNC 916 includes a DP 916A, a MEM 916B that stores a PROG 916C, and a suitable modem and/or transceiver (not shown) for communication with the Node B 912 over the Iub link 940.

Also within the node B 912 is a scheduler (e.g., a function within the DP 912A) that schedule the various UEs under its control for the various UL and DL subframes. Generally, the Node B 912 of an LTE system is fairly autonomous in its scheduling and need not coordinate with the GW/MME 916 excepting during handover of one of its UEs to another Node B.

The second network is similar in FIG. 9 to the first, and has a second node B 914 with a DP 914A, a MEM 914B storing a PROG 914C and a transceiver 914D coupled to an antenna for bi-directional communications over a link 930 with the UE 910. The higher network node for the second network is termed an RNC 918 which also has a DP 918A coupled to a MEM 918B that stores a PROG 918C, and communicates with its own node B over data path 950 and may have a data path 970 with the MME 916 of the first network. The two intersystem node Bs may also be coupled by a data path 960.

At least one of the PROGs 910C, 912C and 914C is assumed to include program instructions that, when executed by the associated DP, enable the electronic device to operate in accordance with the exemplary embodiments of this invention, as detailed above. Inherent in the DPs 910A, 912A, and 914A is a clock to enable synchronism among the various apparatus for transmissions and receptions within the appropriate time intervals and slots required, as the scheduling grants and the granted resources/subframes are time dependent.

The PROGs 910C, 912C, 914C may be embodied in software, firmware and/or hardware, as is appropriate. In general, the exemplary embodiments of this invention may be implemented by computer software stored in the MEM 910B and executable by the DP 910A of the UE 910 and similar for the other MEMs 912B, 914B, 916B, 918B and DPs 912A, 914A, 916A, 918A of the Node Bs 912 and 914 and higher network nodes 916 and 918, or by hardware, or by a combination of software and/or firmware and hardware in any or all of the devices shown.

In general, the various embodiments of the UE 910 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs may be of any type suitable to the local technical environment and may be implemented using any suitable data storage technology, such as semiconductor-based memory devices, magnetic memory devices and systems, optical memory devices and systems, fixed memory and removable memory. The DPs may be of any type suitable to the local technical environment, and may include one or more of general purpose computers, special purpose computers, microprocessors, digital signal processors (DSPs) and processors based on a multi-core processor architecture, as non-limiting examples.

For the aspects of this invention related to an MME for LTE to 2G/3G mapping, embodiments of this invention may be implemented by computer software executable by a data processor of the Node B 912, 914 or higher network node 916, 918, such as the processors 912A, 914A, 916A, 918A shown, or by hardware, or by a combination of software and hardware. According to an embodiment for that aspect there is an apparatus, a computer readable memory having a program of instructions stored upon it for executing actions, and a method that includes receiving first information indicative of at least one application that has requested a secondary PDP context and second information indicative of a corresponding UL TFT to SAE bearing mapping, and generating a map comprising a mapping of at least one SAE bearer to at least one PDP context, and sending third information indicative of the generated map.

For the aspects of this invention related to the aspects of this invention related to an MME for 2G/3G to LTE mapping, embodiments of this invention may be implemented by computer software executable by a data processor of the Node B 912, 914 or higher network node 916, 918, such as the processors 912A, 914A, 916A, 918A shown, or by hardware, or by a combination of software and hardware. According to an embodiment for that aspect there is an apparatus, a computer readable memory having a program of instructions stored upon it for executing actions, and a method that includes receiving first information indicative of at least one PDP context in to at least one SAE/EPS bearer, and generating a map comprising a mapping of the at least one PDP context in use to at least one SAE or EPS bearer, initiating the at least one SAE or EPS bearer, and sending second information indicative of the generated map.

For the aspects of this invention related to a UE for LTE to 2G/3G mapping, embodiments of this invention may be implemented by computer software executable by a data processor of the UE 910A such as the processor 910A shown, or by hardware, or by a combination of software and hardware. According to an embodiment for that aspect there is an apparatus, a computer readable memory having a program of instructions stored upon it for executing actions, and a method that includes sending first information indicative of at least one application that has requested a secondary PDP context and second information indicative of a corresponding UL TFT to SAE bearing mapping, and receiving third information indicative of a map, the map comprising a mapping of at least one SAE bearer to at least one PDP context.

In accordance with the exemplary aspects of the invention there is at least a method, apparatus, and executable computer program to perform actions or functions comprising receiving information comprising at least one packet data protocol context of a target network, and based on the information, mapping in a source network at least one bearer to the at least one packet data protocol context.

Further, in accordance with the above the method, apparatus, and executable computer program to perform actions or functions of sending to a user equipment information comprising an indication of the at least one bearer mapped to the at least one packet data protocol context, and at least one of a corresponding guaranteed bit rate and a traffic flow template for the mapping. Further, according to any of the above to send to a target network device information comprising an indication of at least one supported packet data protocol context for the user equipment. In addition, according to the above where the mapping is performed in a mobility management entity of the source network, and the apparatus may be embodied in a mobility management entity.

In addition, as in any of the preceding the action or function is supported to send to a user equipment information comprising a corresponding packet data protocol context quality of service for the mapped at least one bearer, where as can be the case the at least one bearer is one of a system architecture evolution default bearer or a system architecture evolution dedicated bearer, and where the at least one packet data protocol context is one of a primary packet data protocol context or a secondary packet data protocol context.

In addition, in accordance with the operations above the mapping may be performed on a mobility management entity of the source network, and where the source network may be a long term evolution network and the target network may be a general packet radio service network.

In accordance with the exemplary embodiments of the invention there is at least a method, executable computer programs, and apparatus for receiving from a source network device information comprising an indication of at least one bearer mapped to at least one packet data protocol context of a target network, and storing the received information for use in a handover. In accordance with the above the received information can further comprise at least one of a corresponding guaranteed bit rate and a traffic flow template. In addition, there can be received an indication of a handover procedure from a network device, and in response to receiving the handover indication, sending information comprising the supported mappings to the network device. In addition to the above it may be seen that the at least one bearer is one of a system architecture evolution default bearer or a system architecture evolution dedicated bearer, and the at least one packet data protocol context is one of a primary packet data protocol context or a secondary packet data protocol context. Further, the elements above may be executed in a user equipment, and the handover may be from a long term evolution network to a general packet radio service network.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Further in this regard it should be noted that the various logical step/sequential signaling descriptions above may represent program steps, or interconnected logic circuits, blocks and functions, or a combination of program steps and logic circuits, blocks and functions.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the exemplary embodiments of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above.

What is claimed is:

1. A method comprising:
    receiving from a user equipment, with a device in a source network, information comprising at least one packet data protocol context of a target network supported by the user equipment, where the information is received before a handover of the user equipment to the target network;
    based on the information, mapping in the source network at least one bearer to the at least one packet data protocol context supported by the user equipment; and
    sending from the source network towards the user equipment information comprising an indication of the at least one bearer mapped to the at least one packet data protocol context for use in the handover.

2. The method according to claim 1, where the information sent towards the user equipment further comprises a corresponding guaranteed bit rate and a traffic flow template.

3. The method according to claim 1, comprising:
    sending towards the user equipment information comprising a corresponding packet data protocol context quality of service for the mapped at least one bearer.

4. The method according to claim 1, where the at least one bearer is one of a system architecture evolution default bearer and a system architecture evolution dedicated bearer, and where the at least one packet data protocol context is one of a primary packet data protocol context and a secondary packet data protocol context.

5. The method according to claim 1, comprising:
    sending towards a target network device information comprising an indication of the at least one packet data protocol context supported by the user equipment.

6. The method according to claim 1, where the mapping is performed on a mobility management entity of the source network, and where the source network is a long term evolution network and the target network is a general packet radio service network.

7. The method according to claim 1, where the sending the information from the source network towards the user equipment is before a handover preparation phase of the user equipment.

8. The method according to claim 1, comprising sending towards the user equipment a request to provide measurements of the target network, where the information comprising the at least one packet data protocol context of the target network supported by the user equipment is received in a measurement report from the user equipment in response to the request.

9. A non-transitory computer readable medium encoded with a computer program executable by a processor to perform actions comprising:
    receiving from a user equipment information comprising at least one packet data protocol context of a target network supported by the user equipment;
    based on the information, mapping in a source network at least one bearer to the at least one packet data protocol context supported by the user equipment; and
    sending from the source network towards the user equipment information comprising an indication of the at least one bearer mapped to the at least one packet data protocol context for use in the handover.

10. The non-transitory computer readable medium encoded with a computer program according to claim 9, where the information sent towards the user equipment further comprises a corresponding guaranteed bit rate and a traffic flow template.

11. The non-transitory computer readable medium encoded with a computer program according to claim 9, further comprising:
    sending towards the user equipment information comprising a corresponding packet data protocol context quality of service for the mapped at least one bearer.

12. The non-transitory computer readable medium according to claim 9, where the sending the information from the source network towards the user equipment is before a handover preparation phase of the user equipment.

13. An apparatus comprising:
    at least one processor; and
    at least one memory including computer program code, where the at least one memory and the computer program code are configured, with the at least one processor, to cause the apparatus to at least:
    receive from a user equipment information comprising at least one packet data protocol context of a target network supported by the user equipment, where the information is received before a handover of the user equipment to the target network;
    based on the information, map in a source network at least one bearer to the at least one packet data protocol context supported by the user equipment; and
    send from the source network towards the user equipment information comprising an indication of the at least one bearer mapped to the at least one packet data protocol context for use in the handover.

14. The apparatus according to claim 13, where the information sent towards the user equipment further comprises a corresponding guaranteed bit rate and a traffic flow template.

15. The apparatus according to claim 14, where the at least one memory including the computer program code is configured with the at least one processor to cause the apparatus to send towards a target network device information comprising an indication of the at least one packet data protocol context supported by the user equipment.

16. The apparatus according to claim 13, where the at least one memory including the computer program code is configured with the at least one processor to cause the apparatus to send towards the user equipment information comprising a corresponding packet data protocol context quality of service for the mapped at least one bearer.

17. The apparatus according to claim 13, where the at least one bearer is one of a system architecture evolution default bearer and a system architecture evolution dedicated bearer, and where the at least one packet data protocol context is one of a primary packet data protocol context and a secondary packet data protocol context.

18. The apparatus according to claim 13, where the apparatus is embodied in a mobility management entity of the source network, and where the source network is a long term evolution network and the target network is a general packet radio service network.

19. The apparatus according to claim 13, where the sending the information from the source network towards the user equipment is before a handover preparation phase of the user equipment.

20. The apparatus according to claim 13, where the at least one memory including the computer program code is configured with the at least one processor to cause the apparatus to send towards the user equipment a message comprising a request to provide measurements of the target network, where the information comprising the at least one packet data protocol context of the target network supported by the user equipment is received in a measurement report from the user equipment in response to the request.

21. An apparatus comprising:
means for receiving information from a user equipment comprising at least one packet data protocol context of a target network supported by the user equipment, where the information is received before a handover of the user equipment to the target network;
means, based on the information, for mapping in a source network at least one bearer to the at least one packet data protocol context supported by the user equipment; and
means for sending from the source network towards the user equipment information comprising an indication of the at least one bearer mapped to the at least one packet data protocol context for performing the handover.

22. The apparatus according to claim 21, further comprising
means for sending towards the user equipment information comprising a corresponding guaranteed bit rate and a traffic flow template.

23. The apparatus according to claim 21, further comprising
means for sending towards the user equipment information comprising a corresponding packet data protocol context quality of service for the mapped at least one bearer.

24. A method comprising:
sending by a user equipment towards a device in a source network, information comprising at least one packet data protocol context of a target network supported by the user equipment, where the information is sent before a handover of the user equipment to the target network;
receiving, with a user equipment, from a source network device information comprising an indication of at least one bearer mapped to the at least one packet data protocol context of the target network supported by the user equipment; and
storing the received information for use in the handover.

25. The method according to claim 4, where the received information further comprises at least one of a corresponding guaranteed bit rate and a traffic flow template.

26. The method according to claim 24, comprising,
receiving an indication of a handover procedure from a network device.

27. The method according to claim 24, where the at least one bearer is one of a system architecture evolution default bearer and a system architecture evolution dedicated bearer, and where the at least one packet data protocol context is one of a primary packet data protocol context and a secondary packet data protocol context.

28. The method according to claim 24 wherein the handover is from a long term evolution network to a general packet radio service network.

29. The method according to claim 24, comprising receiving from the device in the source network a message comprising a request to provide measurements of the target network, where the information comprising the at least one packet data protocol context of the target network supported by the user equipment is sent towards the device in a measurement report in response to the request.

30. An apparatus comprising:
at least one processor; and
at least one memory including computer program code, where the at least one memory and the computer program code are configured, with the at least one processor, to cause the apparatus to at least:
sending towards a device in a source network, information comprising at least one packet data protocol context of a target network supported by a user equipment, where the information is sent before a handover of the user equipment to the target network;
receive, with the user equipment, from the source network device information comprising an indication of at least one bearer mapped to at least one packet data protocol context of the target network supported by a user equipment; and
store the received information for use in the handover.

31. The apparatus according to claim 30, where the received information further comprises at least one of a corresponding guaranteed bit rate and a traffic flow template.

32. The apparatus according to claim 30, where the at least one memory including the computer program code is configured with the at least one processor to cause the apparatus to:
receive an indication of the handover procedure from a network device.

33. The apparatus according to claim 30, where the at least one bearer is one of a system architecture evolution default bearer and a system architecture evolution dedicated bearer, and where the at least one packet data protocol context is one of a primary packet data protocol context and a secondary packet data protocol context.

34. The apparatus according to claim 30, where the at least one memory including the computer program code is configured with the at least one processor to cause the apparatus to receive from the device of the source network a message comprising a request to provide measurements of the target network, where the information comprising the at least one packet data protocol context of the target network supported by the user equipment is sent towards the device in a measurement report in response to the request.

35. An apparatus comprising:
    means for sending by a user equipment towards a device in a source network, information comprising at least one packet data protocol context of a target network supported by the user equipment, where the information is sent before a handover of the user equipment to the target network;
    means for receiving, with the user equipment, from the source network device information comprising an indication of at least one bearer mapped to at least one packet data protocol context of the target network supported by the user equipment; and
    means for storing the received information for use in the handover.

36. The apparatus according to claim 35, where the at least one bearer is one of an evolved packet system bearer and a system architecture evolution bearer, and where the at least one packet data protocol context is one of a primary packet data protocol context and a secondary packet data protocol context.

* * * * *